(12) United States Patent
Chung

(10) Patent No.: US 9,256,679 B2
(45) Date of Patent: Feb. 9, 2016

(54) INFORMATION SEARCH METHOD AND SYSTEM, INFORMATION PROVISION METHOD AND SYSTEM BASED ON USER'S INTENTION

(75) Inventor: Hee Sung Chung, Seoul (KR)

(73) Assignee: NEOPAD, INC., Seoul (KR)

( * ) Notice: Subject to any disclaimer, the term of this patent is extended or adjusted under 35 U.S.C. 154(b) by 0 days.

(21) Appl. No.: 13/139,118

(22) PCT Filed: Dec. 11, 2009

(86) PCT No.: PCT/KR2009/007443
§ 371 (c)(1),
(2), (4) Date: Jun. 10, 2011

(87) PCT Pub. No.: WO2010/068068
PCT Pub. Date: Jun. 17, 2010

(65) Prior Publication Data
US 2011/0246496 A1    Oct. 6, 2011

(30) Foreign Application Priority Data

Dec. 11, 2008    (KR) ........................ 10-2008-0125767

(51) Int. Cl.
G06F 17/30    (2006.01)
G06F 17/27    (2006.01)

(52) U.S. Cl.
CPC ........ *G06F 17/30864* (2013.01); *G06F 17/271* (2013.01)

(58) Field of Classification Search
USPC ................................. 707/758, 769
See application file for complete search history.

(56) References Cited

U.S. PATENT DOCUMENTS

| | | | |
|---|---|---|---|
| 2004/0243568 A1* | 12/2004 | Wang et al. ........................ 707/3 |
| 2005/0135571 A1* | 6/2005 | Bangalore et al. ......... 379/88.01 |
| 2006/0074870 A1* | 4/2006 | Brill et al. ........................ 707/3 |
| 2006/0193671 A1* | 8/2006 | Yoshizawa et al. ........... 400/208 |
| 2006/0212142 A1* | 9/2006 | Madani et al. .................. 700/49 |
| 2008/0016040 A1* | 1/2008 | Jones et al. ....................... 707/3 |
| 2008/0172380 A1* | 7/2008 | Czyz et al. ........................ 707/5 |
| 2008/0243783 A1* | 10/2008 | Santi et al. ........................ 707/3 |
| 2009/0077047 A1* | 3/2009 | Cooper et al. .................... 707/4 |
| 2009/0132500 A1* | 5/2009 | Jones et al. ....................... 707/3 |
| 2009/0313117 A1* | 12/2009 | Hu ............................. 705/14.49 |
| 2011/0016125 A1* | 1/2011 | Kang et al. .................... 707/737 |

FOREIGN PATENT DOCUMENTS

| | | | |
|---|---|---|---|
| KR | 1020020028593 A | 4/2002 |
| KR | 100361166 B1 | 11/2002 |
| KR | 1020030006201 A | 1/2003 |

(Continued)

OTHER PUBLICATIONS

International Search Report dated Jul. 27, 2010.

*Primary Examiner* — Son T Hoang
(74) *Attorney, Agent, or Firm* — Sughrue Mion, PLLC

(57) ABSTRACT

Methods for searching for information based on user's intention and for providing information include an editor meeting searcher's intention detected using analysis results for keywords and searches contents having metadata associated with metadata input through the editor. As a result, a search may be formed by detecting searcher's intention from information input by a searcher, inducing a detailed metadata input based on the detected intention, and using the input metadata.

33 Claims, 19 Drawing Sheets

DIRECTORY NAME: LOCATION OF FIRST-BIRTHDAY PARTY

| RESTAURANT NAME | | RESTAURANT NAME |
|---|---|---|
| | | DONG CHEON |
| LOCATION | | LOCATION |
| | | YEOKSAM GANGNAM |
| MENU | | MENU |
| | | CHINESE |
| TELEPHONE NUMBER | | TELEPHONE NUMBER |
| | | 578-0000 |
| TASTE | ⇒ | TASTE |
| | | GOOD |
| PRICE | | PRICE |
| | | EXPENSIVE |
| ATMOSPHERE | | ATMOSPHERE |
| | | GOOD |
| FEATURE | | FEATURE |
| | | 5 MINUTES' DISTANCE OF STATION |
| WAY | | WAY |
| | | MAP INDICATION |
| (a) | | (b) |

(56) References Cited

FOREIGN PATENT DOCUMENTS

| | | |
|---|---|---|
| KR | 100484944 B1 | 4/2005 |
| KR | 1020050092955 A | 9/2005 |
| KR | 1020060011333 A | 2/2006 |
| KR | 1020060043333 A | 5/2006 |
| KR | 1020060062300 A | 6/2006 |
| KR | 100597435 B1 | 7/2006 |
| KR | 1020060087735 A | 8/2006 |
| KR | 100669534 B1 | 1/2007 |
| KR | 1020070015752 A | 2/2007 |
| KR | 100691400 B1 | 3/2007 |
| KR | 1020070029389 A | 3/2007 |
| KR | 100757951 B1 | 9/2007 |
| KR | 100775680 B1 | 11/2007 |
| KR | 100786342 B1 | 12/2007 |
| KR | 1020080000416 A | 1/2008 |
| KR | 100836878 B1 | 6/2008 |
| KR | 1020080052173 A | 6/2008 |

* cited by examiner

| KOREAN WORD | PART INFORMATION | SEMANTIC INFORMATION | SYNONYMOUS INFORMATION | ENGLISH | JAPANESE | CHINESE |
|---|---|---|---|---|---|---|
| 개새끼 | NOUN | ABUSE | SON OF BITCH | SON OF BITCH | ばかやろ | 羔子 |
| 저 | PRONOUN | ABASEMENT | ME | ME | 私 | 弟 |
| 너 | PRONOUN | ABASEMENT | YOU | YOU | おまえ | 尔 |
| 놈 | NOUN | ABASEMENT | FELLOW | FELLOW | わる | 者 |
| 녀석 | NOUN | ABASEMENT | FELLOW | FELLOW | やつ | 棒子 |
| 새끼 | NOUN | ABASEMENT | BITCH | BITCH | ばかやろ | 羔 |
| 시끼 | NOUN | ABASEMENT | BITCH | BITCH | ばかやろ | 羔 |
| 좋다 | ADJECTIVE | FAVORABLE FEELING | GOOD | GOOD | 良い | 良 |
| 나쁘다 | ADJECTIVE | UNFAVORABLE FEELING | BAD | BAD | 悪い | 不好 |
| 지 않다 | ENDING | NOT | NOT | NOT | くない | 不 |
| 세요 | ENDING | REQUEST | INSTRUCTION /RESPECT | DO | ください | 吧 |
| 십시오 | ENDING | REQUEST /RESPECT | REQUEST /RESPECT | DO | ください | 吧 |
| 자 | ASK | ASK/DISRESPECT | ASK /DISRESPECT | LET'S | しよう | 吧 |
| 서울 | NOUN | GEOGRAPHICAL NAME | CAPITAL OF KOREA | SEOUL | ソウル | 首尔 |
| 부산 | NOUN | GEOGRAPHICAL NAME | SECOND CITY OF KOREA | BUSAN | 釜山 | 不善 |
| 캘리포니아 | NOUN | GEOGRAPHICAL NAME | WESTERN PROVINCES OF THE UNITED STATES | CALIFORNIA | カリフォルニア | 加州 |
| 물 | NOUN | MATERIAL | WATER | WATER | みず | 水 |
| 이산화탄소 | NOUN | HARMFUL MATERIAL | CARBON DIOXIDE, GLOBAL WORMING | CARBON DIOXIDE | 二酸化炭素 | 二氧化碳素 |
| 물고 | NOUN | EMBLEM | WATER GATE | WATER GATE | 水戸 | 水戸 |
| 삼성전자 | NOUN | COMPANY NAME | BIGGEST ELECTRONIC COMPANY IN KOREA | SAMSUNG ELEC. | 三星電子 | 三星電子 |
| 엘지전자 | NOUN | COMPANY NAME | FIRST-CLASS ELECTRONIC COMPANY IN KOREA | LG ELEC. | LG電子 | LG電子 |
| 냉면 | NOUN | FOOD NAME | REPRESENTATIVE NOODLE FOOD IN KOREA | NENGMYON | 冷麺 | 冷麺 |
| 비빔밥 | NOUN | FOOD NAME | REPRESENTATIVE HEALTH FOOD IN KOREA | BIBIMBAP | ビビンバ | 拌饭 |
| 이승만 | NOUN | PERSON NAME | KOREAN PRESIDENT | LEE SUNG MAN | 李承晩 | 李承晩 |
| 부시 | NOUN | PERSON NAME | PRESIDENT OF THE UNITED STATES | BUSH | ブッシュ | |
| 는(은) | PREPOSITION | SUGGESTION | | | は | |
| 수출 | NOUN | EXPORT | GO ABOARD | EXPORT | 輸出 | 輸出 |
| 수입 | NOUN | IMPORT | COME ABOARD | IMPORT | 輸入 | 輸入 |
| 소고기 | NOUN | FOOD | MEAT | BEEF | ぎゅうにく | 牛肉 |
| 돼지고기 | NOUN | FOOD | MEAT | PORK | ぶたにく | 猪肉 |
| 김치 | NOUN | FOOD | VEGETABLE | KIMCHI | キムチ | 泡菜 |
| 비싸다 | ADJECTIVE | PRICE | EXPENSIVE | EXPENSIVE | 高い | 贵 |
| 싸다 | ADJECTIVE | PRICE | INEXPENSIVE | CHEAP | 安い | 低廉 |
| 무식한 | ADJECTIVE | UNFAVORABLE FEELING | IGNORANT | IGNORANT | むーち | 固陋 |
| 얼치기 | NOUN | UNFAVORABLE FEELING | | | いい加減なやつ | |
| 악덕업자 | NOUN | UNFAVORABLE FEELING | | VICE DEALER | 悪徳業者 | 悪徳業者 |
| 거짓 | NOUN | UNFAVORABLE FEELING | | LIE | うそ | 假 |
| 부패 | NOUN | UNFAVORABLE FEELING | CORRUPTION | CORRUPTION | くさること | 腐敗 |
| 실패 | NOUN | UNFAVORABLE FEELING | | FAILURE | しっぱい | 失敗 |

FIG. 12

DIRECTORY NAME: LOCATION OF FIRST-BIRTHDAY PARTY

| RESTAURANT NAME |
| --- |
|  |
| LOCATION |
|  |
| MENU |
|  |
| TELEPHONE NUMBER |
|  |
| TASTE |
|  |
| PRICE |
|  |
| ATMOSPHERE |
|  |
| FEATURE |
|  |
| WAY |
|  |

(a)

| RESTAURANT NAME |
| --- |
| DONG CHEON |
| LOCATION |
| YEOKSAM GANGNAM |
| MENU |
| CHINESE |
| TELEPHONE NUMBER |
| 578-0000 |
| TASTE |
| GOOD |
| PRICE |
| EXPENSIVE |
| ATMOSPHERE |
| GOOD |
| FEATURE |
| 5 MINUTES' DISTANCE OF STATION |
| WAY |
| MAP INDICATION |

(b)

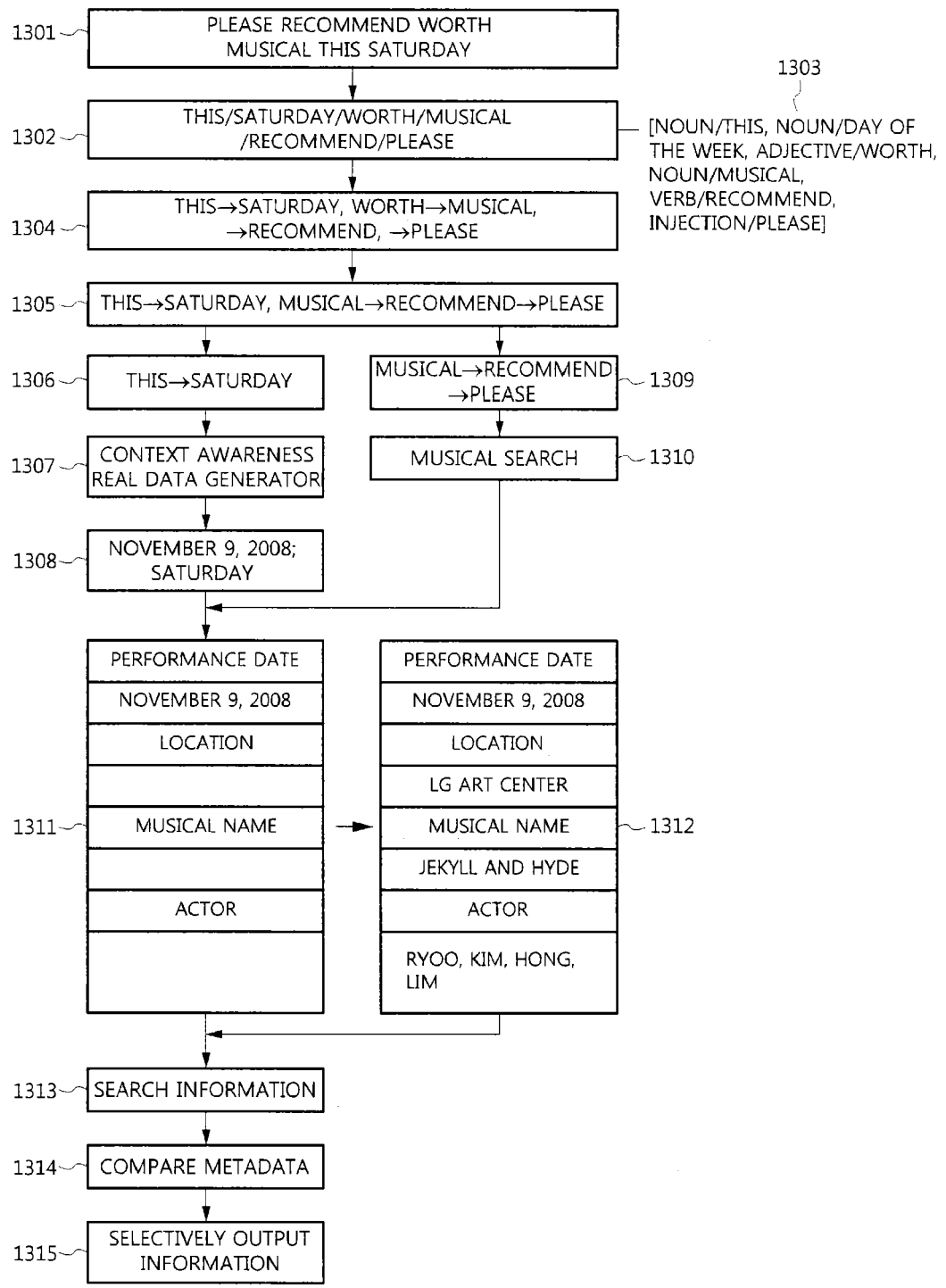

FIG. 14

ARRANGE CONTEXT AWARENESS WORD INDICATING TIME

| | | | |
|---|---|---|---|
| ⋮ | ⋮ | ⋮ | ⋯ |
| THIS TIME | NOUN | PRESENT | |
| LAST TIME | NOUN | PAST | |
| THIS TIME | NOUN | PRESENT | |
| NEXT TIME | NOUN | FUTURE | |
| LAST YEAR | NOUN | PAST | |
| THIS YEAR | NOUN | PRESENT | |
| NEXT YEAR | NOUN | FUTURE | |
| THE YEAR AFTER NEXT | NOUN | FUTURE | |
| THE DAY BEFORE YESTERDAY | NOUN | PAST | |
| THE DAY BEFORE YESTERDAY | NOUN | PAST | |
| TODAY | NOUN | CURRENT | |
| TOMORROW | NOUN | FUTURE | |
| THE DAY AFTER TOMORROW | NOUN | FUTURE | |
| ⋮ | ⋮ | ⋮ | |

THIS SATURDAY = PRESENT DAY OF THE WEEK
X = WEDNESDAY, Y = SATURDAY
THIS SATURDAY = TODAY (WEDNESDAY) + 3 DAYS
THIS SATURDAY = 6 + 3 = 9 DAYS

INFORMATION SEARCH METHOD AND SYSTEM, INFORMATION PROVISION METHOD AND SYSTEM BASED ON USER'S INTENTION

CROSS REFERENCE TO RELATED APPLICATION

This application is the 35 U.S.C. §371 national stage of PCT application PCT/KR2009/007443, filed Dec. 11, 2009, which claimed priority to and the benefit of Korean Patent Application No. 10-2008-0125767, filing date Dec. 11, 2008, both of which are hereby incorporated by reference.

TECHNICAL FIELD

The present invention relates to a multi-functional search method and system capable of providing and searching the information based on words, phrases, and sentences of a natural language as keywords and more accurately providing and searching information based on user's intention.

BACKGROUND ART

Recently, a demand to develop a technology of fusing information and contents providers, expansion of consumers, and various information providing media is increased. An example of a representative fusion technology may include a fusion technology of wired and wireless broadcasting and communication technologies, an integrated information web service technology, and a user interface technology development convenient for various user layers. In the detailed contents of the technology, a development of an information market technology is expected so as to meet the taste and intention of the user of the information contents and suggest and provide the information contents by a convenient and various method by automatically analyzing the quality and meaning analysis of contents and information provided or to be provided by a computer.

For example, Korean Patent Application Laid-Open No. 10-2006-0043333 (SYSTEM AND METHOD FOR DETERMINING INTENTION OF DATA AND RESPONDING TO DATA BASED ON INTENTION) discloses a system facilitating data handling. The system is a system including a component receiving data and a data manager that determines the intention of the data, re-systematizes at least a subset of data based on the intention and automatically provides the re-systematized data to a user. The data manager is a system that analyzes the data, sorts the data into at least a set having relevant features, extracts features from at least one of the sets of data to form the subset of data. Alternatively, the data manager is a system that uses at leas one of metadata, attributes, contents, contexts, keywords, histories, heuristics, inference, rules, damarcation, time, date, related handling costs, related handling gains, and sources of the data so as to facilitate the analysis of data, wherein the features is extracted at least partially on the basis of one of a syntactic structure, syntactic attributes, a linguistic structure, and linguistic attributes. The linguistic feature is a system that includes at least one of words generated from a sentence, a word bigram generated from a sentence, and a word trigram generated from a sentence.

Korean Patent Application Laid-Open No. 2002-0028593 (METHOD FOR ISOLATING HARMFUL WORD) discloses a method for isolating harmful word including allowing a computer user to input member information and access a management server, allowing the computer user to input information for registration/transmission in/to an information input screen displayed by the management server, allowing a module for isolating a harmful word of the management server to determine whether a harmful word is included in the information input by the computer user, and allowing the management server to isolate the connection with the computer user or register/transmit the information according to the determination results of the module for isolating a harmful word. Assuming that the harmful word means jargons, slang, ones related to sexual insulation or personality insulation, the Korean Patent Laid-Open No. 2002-0028593 includes a processing module that continuously performs chatting, when the transmitted message does not include the harmful words. The Korean Patent Laid-Open No. 2002-0028593 is described based on whether the message in chatting includes the harmful words.

Korean Patent Application Laid-Open No. 10-2006-0062300 (MULTISTAGE TEXT FILTERING METHOD FOR ISOLATING HARMFUL SITE) discloses a multistage text filtering method for isolating a harmful site that includes dividing texts to be used as data for isolating a lewd site according to a degree of lewdness and the texts as at least one set and then databasing the texts, collecting the texts from an accessing web site, and performing at least one multi-stage filtering by comparing the texts with the texts in the set to determine whether the accessing web site is isolated, thereby isolating the harmful site according to the degree of lewdness within the texts.

Korean Patent Application Laid-Open No. 10-2006-0062300 (A SYSTEM AND METHOD FOR PROVIDING IMPROVED SPAM MESSAGE FILTERING) discloses a method for providing spam message filtering including: a wireless network server that receives a message to be transmitted from a caller terminal to a user terminal, a Corpus DB that stores usage examples of natural language sentences and their affiliated information and is a large scale language DB (database), a vocabulary analyzing unit that detects reception of the message in the wireless network server and extracts at least one noun type keyword from a sentence included in the received message, a Corpus search device that selects any one of the extracted noun type keywords and searches the frequency of spam used in each sentence included in each user category of the Corpus DB and a general frequency used in sentences included in a category other than the user category, when at least one spam frequency and general frequency are inputted, a probability calculation unit that calculates a probability that a sentence including a selected noun type keyword is included in the user category, and a filtering controller that controls the vocabulary analyzing unit and the Corpus search device to make the probability calculation unit calculate the probability that each noun type keyword is included in a spam message, determines whether the received message is a spam message, and transmits the determining result to the radio network server.

Korean Patent Application Laid-Open No. 10-2008-0000416 (FILTERING SYSTEM FOR HARMFUL MESSAGE AND METHOD THEREOF AND RECORDING MEDIUM THEREOF) discloses a technical field for classifying harmful message with a filtering system for filtering harmful message on internet community. Methods thereof are provided to achieve high marketability in an anti-spam market by offering an intelligent spam filtering technology. The filtering system for harmful message comprises a database for storing messages received from clients, a message receiver that receives the messages, a word extracting unit that extracts a plurality of words from the received messages, and an evaluation unit that determines whether the messages are harmful by using the extracted words, stores it in a database, and the evaluation unit uses the word evaluation value stored in the database to determine whether the massage is a harmful message and the message is sorted into a plurality of harmful message.

Korean Patent Registration No. 10-0484944 (SYSTEM FOR AUTOMATICALLY TAGGING SEMANTICS OF MORPHEME BASED ON LOCAL SYNTAX RELATION AND SEMANTIC CO-OCCURRENCE DICTIONARY) discloses an automatic morpheme semantics tagging system based on a local phrase relationship and a semantic co-occurrence dictionary including a short sentence recognizer that recognizes a short sentence by using a basic syntax generation rule, a dependency syntax rule, an electronic morpheme meaning dictionary, a semantics frame and a declinable phrase co-occurrence dictionary generated via a morpheme analysis of an original sentence, an auxiliary word case recovery module that performs a case recovery for an auxiliary word by using a semantics frame and a declinable phrase semantics co-occurrence dictionary, an argument noun meaning determination module that determines a meaning on an argument noun using the declinable phrase semantics co-occurrence dictionary, a noun phrase meaning determination module that determines a meaning on a noun within a noun phrase and a compound noun using a noun phrase meaning co-occurrence dictionary configured of noun/preposition/noun and co-occurrence information of noun/noun. The automatic morpheme semantics tagging system uses the syntactic structure information in view of a linguistic aspect to use the syntax context information that is more accurate co-occurrence information than the existing other semantic ambiguity devices, thereby proposing a method of solving the meaning ambiguity of noun.

Korean Patent Registration No. 10-0757951 (SEARCH METHOD USING MORPHEME ANALYZING IN WEB PAGE) discloses a searching method through morpheme analysis of a web page including displaying the contents of the connected website to the tab browser, If a client user is connected to a website through the tab browser, discriminating a frequency of repeated sentence or words by performing a context morpheme analysis for the contents displayed to the tab browser of a client by an analysis server, selecting the sentence and words having a frequency of a predetermined value or more among the identified words as keywords that are important words, outputting the selected important words as a title of each tab browser, searching the title of each tab browser as a query word of a portal site and outputting the search results as contents of each tab browser, in an analyzing server providing information to the client such as notebook, mobile phone, PDA, or the like. The patent calculates the number of sentences and the number of words that appears in the text with one methodology of the search system by the morpheme processing to output the tab browser title as the keyword.

Korean Patent Registration No. 10-0691400 (METHOD FOR ANALYZING MORPHEME USING ADDITIONAL INFORMATION AND MORPHEME ANALYZER FOR EXECUTING THE METHOD) discloses a method for analyzing morphemes including obtaining morpheme analysis object and additional information associated with the morpheme analysis object from data for index, generating a key based on the additional information, and performing the morpheme analysis on the morpheme analysis object using the key.

Korean Patent Application Laid-Open No. 10-2007-0029389 (METHOD AND SYSTEM FOR PROVIDING ADVERTISEMENT SERVICE USING CORE KEYWORD AND RECORD MEDIA RECORDED PROGRAM FOR REALIZING THE SAME) discloses a recording medium that is typically implemented with command words executable by a digital processing device in order to provide a keyword advertisement service using a core keyword and may be read by a digital processing device, including extracting the keyword by analyzing morphemes of contents text, determining core keywords through interfacing with an advertisement keyword DB server, receiving an advertisement list matching the core keyword through the interfacing with the advertisement DB server, and inserting at least one of the advertisements included in the advertisement list into the contents text.

Korean Patent Application Laid-Open No. 10-2006-0011333 (SYSTEM AND METHOD FOR PROVIDING LOCAL INFORMATION BY MESSAGE ANALYSIS) discloses a system for providing local information including: a database that stores advertisement information of each area and business type, a message recognizing unit that analyzes a short message stored or a text message stored, a voice recognizing unit that analyzes the stored voice message, a location information collecting unit that checks a current location of a subscriber terminal, a service controller that requests whether a message related to a service subscriber has been stored from the message recognizing unit and the voice recognizing unit, checks a received message analysis result, requests current location information of the subscriber terminal from the location information collecting unit, and provides a desired business type and area information according to the message analysis result to the subscriber terminal, and an SMS generation unit that searches information of the database, adds a searched result in a short message, and transmits it to the subscriber terminal.

Korean Patent Application Laid-Open No. 10-2007-0015752 (SYSTEM AND METHOD FOR AD TRIGGERING MESSAGING SERVICE BASED ON MOBILE MESSAGING SERVICE) discloses a system for AD triggering messaging service including a message server transmitting the contents of the message to the receiving terminal after transmitting the predetermined AD message to the caller terminal when detecting the AD triggering identifier by analyzing a message transmitted from a caller terminal.

Korean Patent Registration No. 10-0775680 (METHOD AND SYSTEM FOR PROVIDING ADVERTISEMENT CONTENTS BY USING CHATTING IN MOBILE TERMINAL) discloses a method of transmitting and receiving message through a messenger between a mobile communication terminal and a server through a wireless communication network, including determining whether the mobile communication terminal connected to the server selects any virtual chatting partner of chatting partners, extracting chatting scenario of AD contents good according to the user preference information of the mobile communication terminal in the server to transmit the message according to the scenario rule to the mobile communication terminal, transmitting a response message for the message of the server in the mobile communication terminal, analyzing the message of the mobile communication terminal received in the server and transmitting the message requesting the AD contents information recommendation permission according to the user's intention and the scenario rule to the mobile communication terminal, transmitting the AD contents information to the mobile communication terminal when transmitting the message permitting the AD contents information recommendation from the mobile communication terminal in the server, and adjusting the character state of the messenger to correspond to the user's intention by analyzing the message of the mobile communication terminal in the server prior to the transmitting of the message to the mobile communication terminal.

Korean Patent Registration No. 10-0597435 (SYSTEM AND METHOD FOR CLASSIFYING QUESTION BASED ON HYBRID OF INFORMATION SEARCH AND QUESTION ANSWER SYSTEM) discloses a system and method for classifying a question based on a hybrid of an information search and question answer system including a questioned work name processor that recognizes the work name included in the inputted question, a question language analyzer that converts each word into a semantic code through a morpheme analysis process, an object name recognition process, and a word meaning tagging process, a rule-based question classifier that classifies the answer type requested from the question by using an LSP (Lexico-Semantic Pattern) code of the question and a predefined question classification rule, a statistics-based question classifier that classifies the LSP code of the question by using statistics information constructed in a learning document tagging the answer type, and a questioned answer type determiner that finally determines the answer type of the user question by using a result of both classifiers.

Korean Patent Registration No. 10-0361166 (SYSTEM AND METHOD FOR SEARCHING INFORMATION) discloses a system and method for searching information including a processing device that codes input words and searches the data base based on the coded words to search the information corresponding to the code words when inputting words indicating information to be searched or a field to which the corresponding information belongs after a data base that sorts a plurality of information according to field, allocates codes to each sorted field, and codes words indicating a plurality of information included in the corresponding field in association with a code of each field accesses a user searching data via a network using a communication device, wherein the information stored in the database is sorted into the plurality of information regions, the information regions are each allocated with an information sorting code which is sorted into at least one detailed information region, the detailed information regions are coded in association with the information sorting code of the corresponding information regions, the words having meanings equal or similar to each other among the words indicating the corresponding information are stored by the same code, each word code is arranged in a set order.

Korean Patent Application Laid-Open No. 10-2005-0092955 (SYSTEM AND METHOD FOR ONLINE AD INCLUDING COPY OF ADVERTISER FIT FOR CONTENTS) discloses a system and method for advertising online including a first storage device in which information to be advertised is stored; a second storage device in which original contents are stored; at least one server that fetches the original contents from the second storage device, analyzes the original contents by a natural language processing mechanism, and fetches the information to be advertised corresponding to the analysis results from the first storage device and inserts a portion of the information among the advertisement information into the original contents, a third storage device in which the contents inserted with the advertisement information is stored by the at least one server.

Korean Patent Registration No. 10-0669534 (METHOD AND SYSTEM FOR EXTRACTING SUMMARY OF DOCUMENT BY UTILIZING SENTENCE ABSTRACTION AND ABDUCTION RULES) discloses a method of summarizing a document using sentence abstraction and abduction rules: including sentence inputting that inputs and stores document contents to be summarized, syntax analyzing that analyzes and stores a syntax for data stored in the step; sentence main component extracting that sequentially reads the syntax data at the step and stores ontology data; sentence abstracting that understands each of the selected main components as an abstraction meaning by comparing the ontology data value at the step with a recognition upper range information that is a predetermined sorting reference for meanings included in each of the selected main components; topic sentence selecting that reads the stored value at the step and input the read stored value to an abduction rules program movable device unit to select a plurality of topic sentences having abduction between syntaxes and store each identification value for the plurality of selected topic sentences; summary writing that reads corresponding values of abstraction meaning understood for the stored and selected main components at the step and combines and stores the read values as a grammar summary sentence; a summary sentence outputting that determines whether there is the output control signal and if so, outputs an displays the data value stored at the step through the operation of the output unit.

Korean Patent Registration No. 10-0836878 (APPARATUS AND METHOD FOR ALLOCATION OF SUBJECT OR FIELD IN INFORMATION SEARCH SYSTEM) is an apparatus for allocating a subject or a field in an information search system that is connected to a user terminal, a web portal site, a web site, searches information, and provides the searched information, the information search server including a search engine that performs information search for a document based on an index word corresponding to a query word or a document; a database that stores and manages information searched in the search engine; a thesaurus matching unit that extracts the index words from an original sentence stored in the database and performs thesaurus matching by the index word to perform the subject or filed allocation for the original sentence; a folksonomy processor that extracts terminologies from a definition sentence stored in the database and allocates the subject by the extracted terminologies and uses folksonomy to allocate a field.

In addition, the information search system used by a large information search portal such as Google, Yahoo, or the like, is based on a search key type of a "word" unit. Although a 'phrase' input may be performed, a current technology connects an N-gram based index key by a logical operator (AND, OR, NOT) rather than a language processing method according to a high technology of the "phrase" to propose the search results, such that there is a limitation in improving the reproduction and accuracy of the information search. In particular, a 'mobile information search' technology has been in the limelight as a next generation information search field and a new web search technology is being proposed and discussed as a "semantic web' technology. However, there is no special successful example up to now.

DISCLOSURE

Technical Problem

The present invention is contrived to solve the above-mentioned problems. An object of the present invention is to provide a method and system for searching multifunctional integration information capable of extending a search key in a phrase unit and a sentence unit in an information search system using a word unit as a keyword to more facilitate a user interface of the information search system and performing multifunctional integration processing such as provision, search, classification, evaluation, monitoring of information, or the like.

In addition, another object of the present invention is to provide a method and system for searching multifunctional integration information capable of detecting information searcher's or information provider's intention and providing information results based on the detected intention.

Technical Solution

In order to achieve the above-mentioned objects, according to an exemplary embodiment of the present invention, there is provided a method for searching information, including: detecting searcher's intention using an analysis results for keywords; providing an editor meeting the searcher's intention to the searcher; and searching contents having metadata associated with metadata input through input terms of the editor.

The method for searching information may further include: separating the input keywords into meaning words; and performing syntax analysis on the separated keywords; wherein the detecting of the searcher's intention may detect the searcher's intention using the syntax analysis results at the performing of the syntax analysis.

The performing of the syntax analysis may output as the syntax analysis results a syntax expression obtained by analyzing whether the separated words has any grammar relationship and semantic relations within a sentence.

The syntax expression may be at least one of a logical expression, a modification-modified and syntax list expressions.

The performing of the syntax analysis may refer to a syntax grammar rule dictionary in order to analyze whether the separated words has any grammar relationship and semantic relations within a sentence, and the syntax grammar rule dictionary may list at least one of a phrase structure grammar, a case grammar, a sensitive grammar, a vocabulary grammar.

The separating may separate the keyword for each part.

The separating may separate the keywords for each part by referring to information on a part of each word that is data-based in the morpheme dictionary.

The method for searching information may further include extracting the metadata for the contents meeting the searcher's intention, wherein the providing of the editor may provide an editor, in which the extracted metadata become input terms as an editor meeting the searcher's intention.

The method for searching information may further include determining a directory performing a search by referring to the information provider's intention, wherein the searching may search the contents in the same or similar directory as or to the determined directory.

The keyword may be any one of a word unit, a phrase unit, and a sentence unit.

The searching may search contents having the same metadata as at least one of the metadata input through the input terms of the editor or the synonymous metadata with at least one of the metadata input through the input terms of the editor.

The method for searching information may further include adding additional services to the search results at the searching.

The additional service may be a contents context awareness service and the contents context awareness may include at least of guide services, selling service, advertising services, education services, consulting services, recommendation services, and administrative services.

At least one of the input terms of the editor may be automatically input as a real data generated using the keywords.

The method for searching information may further include selecting and outputting the contents having high coincidence by comparing the input metadata and the metadata configuring the searched contents, respectively.

According to another exemplary embodiment of the present invention, there is provided a method for providing information for search, including: detecting information provider's intention providing information by using analysis results for texts included in the information; providing an editor meeting the information provider's intention to a user; and storing contents integrating metadata input through input terms of the editor.

The method for providing information for search may further include: separating the texts included in the input information into meaning words; and performing syntax analysis on the separated keywords, wherein the detecting of the information provider's intention may detect the information provider's intention providing the information using the syntax analysis results at the performing of the syntax analysis.

The performing of the syntax analysis may output as the syntax analysis results a syntax expression obtained by analyzing whether the separated words has any grammar relationship and semantic relations within a sentence.

The syntax expression may be at least one of a logical expression, a modification-modified and syntax list expressions.

The performing of the syntax analysis may refer to a syntax grammar rule dictionary in order to analyze whether the separated words has any grammar relationship and semantic relations within a sentence, and the syntax grammar rule dictionary may list at least one of a phrase structure grammar, a case grammar, a sensitive grammar, a vocabulary grammar.

The separating may separate the text for each part

The separating may separate the texts for each part by referring to information on a part of each word that is data-based in the morpheme dictionary.

The method for providing information for search may further include extracting the metadata for the contents meeting the information provider's intention, wherein the providing of the editor may provide an editor in which the extracted metadata become input terms as an editor meeting the information provider's intention.

The method for providing information for search may further include determining a directory in which the information is stored by referring to the information provider's intention, wherein the storing of the contents may store the contents in the determined directory.

The method for providing information for search may further include collecting texts included in contents divided for each directory, wherein the detecting may use the analysis results for the collected texts.

According to another exemplary embodiment of the present invention, there is provided a method for providing information for search, including: collecting texts included in contents divided for each directory; detecting information provider's intention providing information using analysis results for the collected text; providing an editor meeting the information provider's intention to a user; and storing contents integrating metadata input through input terms of the editor.

According to another exemplary embodiment of the present invention, there is provided a method for searching information, including: receiving keywords; receiving searcher's intention inputting the keywords; providing an editor meeting final intention integrating analysis results for the keywords and the searcher's intention to the searcher; and searching contents having metadata associated with the metadata input through input terms of the editor.

The method for searching information may further include: separating the input keywords into meaning words; and performing syntax analysis on the separated keywords, wherein the providing of the editor may use the syntax analysis results at the performing of the syntax analysis.

According to another exemplary embodiment of the present invention, there is provided a method for providing information for search, including: receiving information; receiving information provider's intention inputting the information; providing an editor meeting final intention integrating analysis results for the information and the information provider's intention to the information provider; and storing contents integrating the metadata input through input terms of the editor The method for providing information for search may further include: separating the input information into meaning words; and performing syntax analysis on the separated words, wherein the providing of the editor may use the syntax analysis results at the performing of the syntax analysis.

Advantageous Effects

As set forth above, the exemplary embodiment of the present invention can perform the search of a level of "phrase" and "sentence" to make the reproducibility and accuracy of the information, as compared with the existing search method that uses the 'search word' as the keywords and searches another search word using a combination of the logical operators AND, OR, and NOT as the extension of the keyword.

Further, the exemplary embodiment of the present invention can classify and store the information provided by the information provider for each directory according to the provider's intention and perform the search for the information stored in the corresponding directory by detecting the information searcher's search intention, thereby providing the consensual/tailored search services through the context awareness information provision/search.

Furthermore, the exemplary embodiment of the present invention defines different metadata for each content and adopts the method of developing the information provision and the search contents in more detail by using the editor generated based on the metadata, thereby more conveniently and accurately performing the search as compared with the existing search method.

In addition, the exemplary embodiment of the present invention by detecting the searcher's intention from information input by the searcher, inducing the detailed metadata input based on the detected intention, and using the input metadata, thereby performing the search in the directory meeting the searcher's intention.

Further, in the exemplary embodiment of the present invention, the information provider or the searcher may more conveniently input the metadata and may receive a guide on which type of metadata are input, thereby increasing the convenience of input.

Furthermore, the exemplary embodiment of the present invention can divide the corresponding information for each directory based on the information provider's intention and can match and store the corresponding metadata.

Meanwhile, the exemplary embodiment of the present invention can detect the searcher's intention from the information input by the searcher and induces the input of the detailed metadata based on the detected intention, such that the metadata generating the real data can be automatically input.

Further, the exemplary embodiment of the present invention can directly input the information provider's and information searcher's intention to more accurately detect the information provider's and information searcher's intention, thereby accurately providing and searching the information.

Furthermore, the exemplary embodiment of the present invention can distribute the promotion materials of candidates to the voters using PCs, mobile phones, or the like, thereby rapidly providing the promotion materials of candidates by the paper poster that is being currently used at low cost.

DESCRIPTION OF DRAWINGS

FIG. 3 is a diagram showing a Korean morpheme dictionary.

FIGS. 11 and 12 are diagrams provided for explaining a search method according to another exemplary embodiment of the present invention.

FIG. 13 is a diagram provided for explaining a search method according to another exemplary embodiment of the present invention.

FIGS. 14 to 16 are diagrams provided for additionally explaining a search method shown in FIG. 13.

EXPLANATION OF REFERENCE SYMBOLS

101: INFORMATION SEARCH WINDOW
102: KEYWORD INPUT DEVICE

103: KEYWORD MORPHEME PROCESSOR
104: KEYWORD SYNTAX ANALYZER
105: SEARCHER'S INTENTION DETECTOR
106: INFORMATION MONITOR
107: METADATA EXTRACTOR FOR SEARCH
108: EDITOR FOR SEARCH
109: SEARCH DIRECTORY DETERMINATION DEVICE
110: SEARCH DEVICE
111: METADATA COMPARATOR
112: ADDITIONAL SERVICE DATABASE
113: ADDITIONAL SERVICE GENERATOR
114: SEARCH RESULT GENERATOR
115: INFORMATION STORAGE UNIT
116: STORAGE DIRECTORY DETERMINATION DEVICE
117: INFORMATION PROVIDING EDITOR
118: INFORMATION PROVIDING METADATA EXTRACTOR
119: METADATA DB
120: INFORMATION PROVIDER'S INTENTION DETECTOR
121: INFORMATION MONITOR
122: INFORMATION SYNTAX ANALYZER
123: SYNTAX GRAMMAR RULE DICTIONARY
124: INFORMATION MORPHEME PROCESSOR
125: MORPHEME DICTIONARY
126: INFORMATION INPUT DEVICE
127: INFORMATION PROVIDING WINDOW
128: INFORMATION DATABASE
129: SEARCH RESULT DISPLAY UNIT
1001: INFORMATION SEARCH WINDOW
1002: KEYWORD INPUT DEVICE
1003: KEYWORD MORPHEME PROCESSOR
1004: KEYWORD SYNTAX ANALYZER
1005: SEARCHER'S INTENTION DETECTOR
1006: INFORMATION MONITOR
1007: METADATA EXTRACTOR FOR SEARCH
1008: EDITOR FOR SEARCH
1009: SEARCH DEVICE
1010: METADATA COMPARATOR
1011: ADDITIONAL SERVICE DATABASE
1012: ADDITIONAL SERVICE GENERATOR
1013: SEARCH RESULT GENERATOR
1014: INFORMATION STORAGE DEVICE
1015: INFORMATION PROVIDING EDITOR
1016: INFORMATION PROVIDING METADATA EXTRACTOR
1017: METADATA DB
1018: CONTENTS PROVIDER'S INTENTION DETECTOR
1019: INFORMATION MONITOR
1020: SYNTAX ANALYZER
1021: SYNTAX GRAMMAR RULE DICTIONARY
1022: MORPHEME PROCESSOR
1023: MORPHEME DICTIONARY
1024: DIRECTORY CONTENTS CRAWLER
1025: INFORMATION DB
1026: SEARCH RESULT DISPLAY DEVICE
1027: SEARCH DIRECTORY DETERMINATION DEVICE
1028: STORAGE DIRECTORY DETERMINATION DEVICE
1701: INFORMATION PROVIDE/SEARCH WINDOW
1702: MORPHEME PROCESSOR
1703: MORPHEME DICTIONARY
1704: SYNTAX ANALYZER
1705: SYNTAX GRAMMAR RULE DICTIONARY
1706: INTENTION DESIGNATOR
1707: INFORMATION MONITOR
1708: INFORMATION PROVIDING METADATA EXTRACTOR
1709: INFORMATION PROVIDING EDITOR
1710: STORAGE DIRECTORY DETERMINATION DEVICE
1711: INFORMATION STORAGE DEVICE
1712: INFORMATION DB
1714: METADATA EXTRACTOR FOR SEARCH
1715: EDITOR FOR SEARCH
1716: SEARCH DIRECTORY DETERMINATION DEVICE
1717: SEARCH DEVICE
1718: METADATA COMPARATOR
1719: SEARCH RESULT GENERATOR
1720: SEARCH RESULT DISPLAY DEVICE
1721: ADDITIONAL SERVICE DB
1722: ADDITIONAL SERVICE GENERATOR

BEST MODE

Hereinafter, exemplary embodiments of the present invention will be described with reference to the accompanying drawings.

Figure 1:
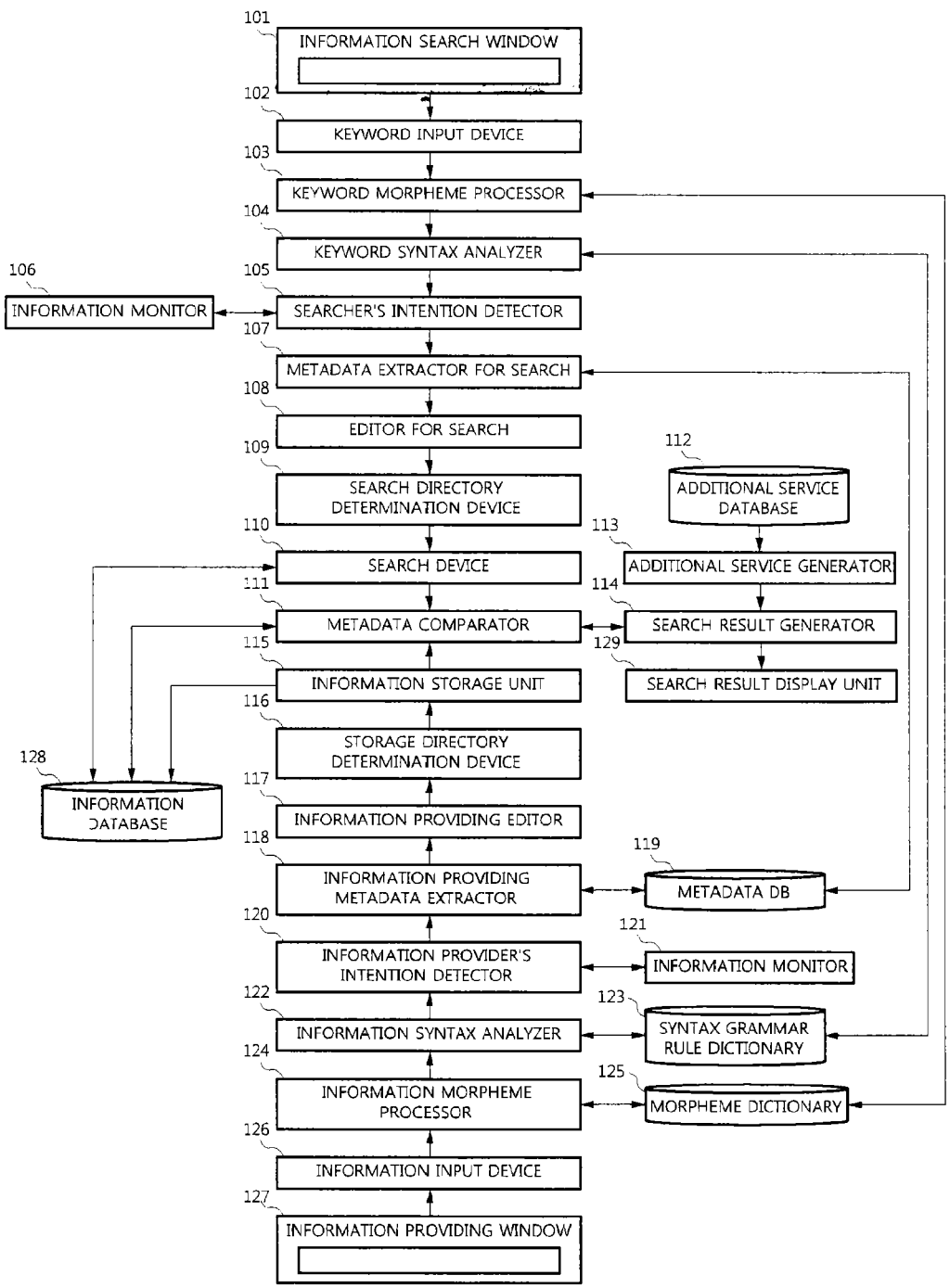
FIG. 1 is a diagram showing a search system according to an exemplary embodiment of the present invention.

FIG. 1 shows a search system according to an exemplary embodiment of the present invention. Blocks configuring the search system according to the exemplary embodiment of the present invention may be implemented by S/W and H/W. In addition, some of the blocks configuring the search system may be implemented by S/W and the rest blocks may be implemented by H/W.

The search system according to the exemplary embodiment of the present invention provides consensual/tailored search services through context awareness information provision/search that classifies and stores information provided by an information provider for each directory according to provider's intention and performs a search on the information stored in the corresponding directory by detecting information searcher's search intention.

In addition, the exemplary embodiment of the present invention defines different metadata for each content and adopts a method of developing information provision and search contents in more detail by using an editor generated based on the metadata, thereby more conveniently and accurately performing the search as compared with the existing search method.

In this case, the metadata may be data that may minutely and systematically define features of contents that are an object of the information provision/search. For example, the metadata for 'book' indicate the detailed information on a book, such as a book name, an author, a publisher, a publishing year, a price, a subject, or the like.

In the exemplary embodiment of the present invention, it is possible to input and confirm the metadata through the editor having a defined frame. The frame format may be implemented by a table format or a sentence format.

Figure 2:
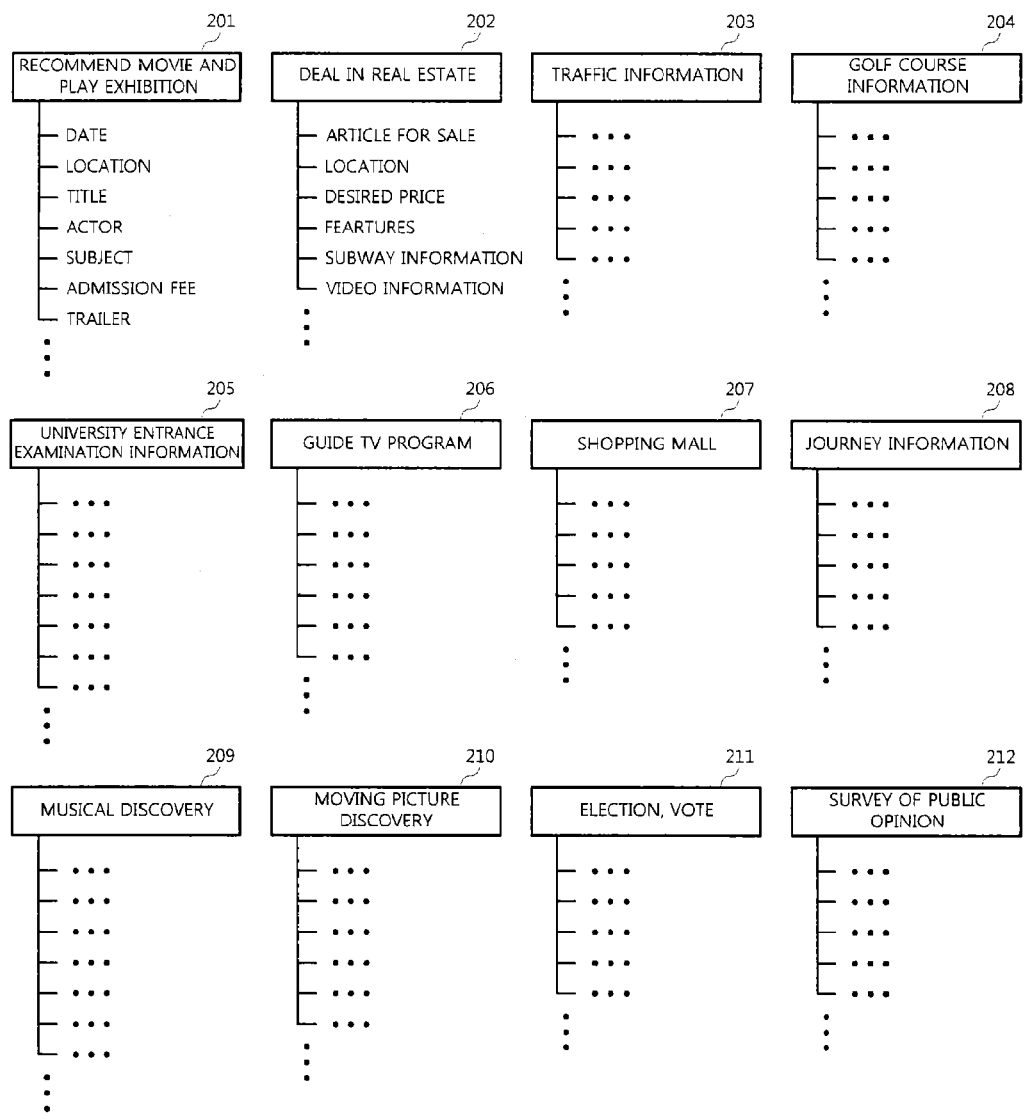
FIG. 2 is a diagram showing metadata for contents.

FIG. 2 is a diagram showing metadata for contents. As shown in FIG. 2, it can be confirmed that metadata essential for contents of all regions are defined.

For example, it can be confirmed that in a deal in real estate 202, "article for sale", "location", "desired price", "features", "subway information", and "video information", or the like, is standardized as metadata.

The metadata for contents shown in FIG. 2 are stored in a metadata DB 119 shown in FIG. 1.

Meanwhile, as shown in FIG. 1, the search system according to the exemplary embodiment includes an information search window 101, a keyword input device 102, a keyword morpheme processor 103, a keyword syntax analyzer 104, a searcher's intention detector 105, an information monitor 106, a metadata extractor for search 107, an editor for search 108, a search directory determination device 109, a search device 110, a metadata comparator 111, an additional service database 112, an additional service generator 113, a search result generator 114, an information storage device 115, a storage directory determination device 116, an information providing editor 117, an information providing metadata extractor 118, a metadata DB 119, an information provider's intention detector 120, an information monitor 121, an information syntax analyzer 122, a syntax grammar rule dictionary 123, an information morpheme processor 124, a morpheme dictionary 125, an information input device 126, an information providing window 127, an information DB 128, and a search result display device 129.

The information input device 126 transfers information input by a user through the information providing window 127 to the information morpheme processor 124.

The morpheme dictionary 125 databases part information of each word. In addition, the morpheme dictionary 125 databases extension information of each word, synonym information, extension information of translation foreign language, or the like. In this case, since there is no limitation for words registered in the morpheme dictionary 125, the morpheme dictionary 125 may also be registered with parts (pronoun, adjective, postposition, ending, or the like).

The part information registered in the morpheme dictionary 125 is referenced to separate texts for each part and the semantic information is used to understand the content writer or searcher' intention. In addition, the synonym information is used to perform the extension search in a wider range and the translation foreign language is used to perform a multilingual search.

FIG. 3 shows information registered in the morpheme dictionary 125 and the morpheme dictionary 125 will be described below with reference to FIG. 3.

The information morpheme processor 124 separates the text transferred from the information input device 126 in a 'semantic word' unit. In this case, the "semantic word' means a part. As a result, it may be understood that the information morpheme processor 124 separates texts for each part.

To this end, the information morpheme processor 124 separates texts for each part by referring to the part information on the word databased in the morpheme dictionary 125.

The information syntax analyzer 122 performs the syntax analysis on the information input by the user, based on the morpheme processing results of the information morpheme processor 124. The information syntax analyzer 122 refers to the grammar rule registered in the syntax grammar rule dictionary 123 at the time of performing the syntax analysis.

The information provider's intention detector 120 uses the syntax analysis results output from the information syntax analyzer 122 to detect the information provider's intention.

The information monitor 121 outputs the information provider's intention detected by the information provider's intention detector 120 so as to be visible by the user. To this end, the information monitor 121 may use a graphic tool.

The information providing metadata extractor 118 extracts the metadata for the contents meeting the information provider's intention detected by the information provider's intention detector 120 from the metadata DB 119.

The information providing editor 117 generates an editor in which the metadata extracted by the information providing metadata extractor 118 are formed as input terms and provides the editor to the information provider.

The storage directory determination device 116 determines the directory on the information DB 128 suitable to store the contents. In this case, the storage directory determination device 116 may determine the directory by referring to the information provider's intention detected by the information provider's intention detector 120.

The information storage device 115 stores the contents integrating the metadata generated by the information providing editor 117 in the information DB 128. In this case, the contents are stored in the directory determined by the storage directory determination device 116.

The components described above are components used to generate and store information necessary to provide the information. Hereinafter, when the information searcher requests the search by inputting keywords, the components to more accurately perform the search will be described in detail by inducing the detailed keyword input through the detection of the search intention. In this case, an example of the keywords input by the user may include words, phrases, and sentences.

The information search window 101 provides the input window by which the user may input the keywords as words, phrases, or sentences. Further, the keyword input device 102 transfers the keywords input by the user through the information search window 101 to the keyword morpheme processor 103.

The keyword morpheme processor 103 separates the keywords transferred from the keyword input device 102 in a 'semantic word' unit. In this case, the "semantic word' means a part. As a result, it may be understood that the keyword morpheme processor 103 separates keywords for each part, in a similar manner to the information morpheme processor 124.

To this end, the keyword morpheme processor 103 separates texts for each part by referring to the part information on the word databased in the morpheme dictionary 125.

The keyword syntax analyzer 104 performs the syntax analysis on the keywords input by the searcher, based on the morpheme processing results of the keyword morpheme processor 103. The keyword syntax analyzer 104 refers to the syntax grammar rule dictionary 123 at the time of performing the syntax analysis.

The searcher's intention detector 105 uses the syntax analysis results output from the keyword syntax analyzer 104 to detect the searcher's intention.

The information monitor 106 outputs the searcher's intention detected by the searcher's intention detector 105 so as to be visible by the user. To this end, the information monitor 106 may use a graphic tool.

The metadata extractor for search 107 extracts the metadata for the contents meeting the searcher's intention detected by the searcher's intention detector 105 from the metadata DB 119.

The editor for search 108 generates the editor in which the metadata extracted by the metadata extractor for search 107 are formed as input terms and provides the editor to the searcher.

The search directory determination device 109 determines the directory on the information DB 128 suitable to search the contents. In this case, the search directory determination device 109 may determine the directory by referring to the searcher's intention detected by the searcher's intention detector 105. Further, the search directory determination device 109 may additionally determine the directories similar to the determined directories. This is to perform a wider range of search.

The search device 110 searches the contents having the same metadata as the metadata input by the editor for search 108 in the information DB 128. In this case, the search is performed in the directory determined in the search directory determination device 109.

The search device 110 may perform the extension search that performs the search by replacing the metadata input by the editor for search 108 with the synonymous metadata.

Further, the search device 110 may search the contents having the exactly same metadata as the metadata in view of the structure and word and the same metadata as the metadata only in view of some of the structure and word. That is, the search device 110 may also perform the same search, a partial search, or a related search.

The metadata comparator 111 compares the metadata input through the editor for search 108 with the metadata configuring the contents searched by the search device 110 and selects and outputs only the contents having the high coincidence based on the comparison results. As described above, the comparison (determining the coincidence) may be performed by comparing the metadata, respectively, formed in a table format.

The additional service database 112 may store a unit that provides the site information appropriate for the searcher's search intention or the relevant advertising service, or the like.

The additional service generator 113 generates the additional services related to the keywords. To this end, the additional service generator 113 uses the additional services appropriate for the searcher's search intention among the additional services that are stored in the additional service database 112.

The additional services provided by the additional service database 112 and the additional service generator 113 may be implemented as the contents context awareness services. In this case, an example of the contents context awareness services may include guide services, selling service, advertising services, education services, consulting services, recommendation services, administrative services, or the like.

The search result generator 114 adds the additional services generated from the additional service generator 113 according to the coincidence with the search results (contents) output from the metadata comparator 111.

The search result display unit 129 outputs the search results added with the additional services generated from the search result generator 114 through the screen so as to be provided to the user.

Meanwhile, only the coincidence with the search results may be provided to the user, without providing the additional services. This may be implemented in such a manner that the additional service generator 113 does not generate the additional services or the search result generator 114 does not add the generated additional services even though the additional service generator 113 generates the additional services.

Hereinafter, the above-mentioned morpheme dictionary 125 will be described in detail with reference to FIG. 3. FIG. 3 shows a Korean morpheme dictionary as an example of the morpheme dictionary.

As shown in FIG. 3, the morpheme dictionary 125 is configured to list 1) Korean words in a first column, 2) part information of words in a second column, 3) semantic information of words in a third column, 4) a set of synonyms (or, synonymous phrases), similar words, and/or a representative words in a fourth column, 5) a translation English in a fifth column, 6) a translation Japanese in a sixth column, and 7) a translation Chinese in a seventh column, respectively.

The morpheme dictionary 125 shown in FIG. 3 is used to allow the information morpheme processor 124 to process the texts as the morpheme and to allow the keyword morpheme processor 103 to process the keywords as the morpheme.

As described above, the morpheme processing indicates whether the element of the given sentence is configured as any meaning word. For example, when "학교에 간다 (I go to the school)" is processed as the morpheme, dividing the word boundary such as "학교+에+가+ㄴ다" is the morpheme processing.

In this case, the used information, which is the part information stored in the morpheme dictionary 125, investigates the relationship between respective parts and outputs the relationship such as "학교 /noun+에/ proposition+가 /verb+ㄴ다 /ending" as the processing result.

Further, as the incidental information of the morpheme processing, the language statistical value such as "word frequency", "the number of sentences may be obtained and the semantic information, the synonym information, the translation foreign language may be simultaneously output.

Meanwhile, the semantic information registered in the morpheme dictionary 125 is sorted as follows.

1) Case of Noun
Thing/Nature/Material/Element/Tool/Means/Human Relations/Society/Crime/Organization/Culture/Animal/Human/Plant/Number/Abstraction/Construction/Concreteness/Behavior/Status/Time/Place/ Location /Period/Frequency/Ratio/Degree/Quantity/Emphasis/Truth/Emotion/Abuse/Abasement/ Politic/Economy/Company Name/Area Name/Thinking/Person Name/Food/Lewdness/Medical Supplies, or the like.

2) Case of Verb
Behavior/Instant/Continuation/Movement/Change/Emotion/Thinking/Awareness/Presence/Determination/Unintention/Expression/Service, or the like.

3) Case of Adjective
Status/Relation/Property/Degree/Emphasis/Good Feeling/Non-Good Feeling/Choice/Lewdness/Aspect, or the like.

4) Case of Proposition
Phrase|Means/Method|Raw Material/Material|Cause/Reason|Source/Starting|Point Origin Point/Direction|Object/Target|Result Giving End|Receiving End|Place|Time|Case|Content|Role|Contrast|Range/Frequency|Degree|Quantity|Ratio|Emphasis|Truth|Aspect, or the like.

5) Case of Adverb
|Emphasis|, or the like.

6) Case of Ending Representing Aspect
Past|Current|Future|Negation|Possibility|Intimacy|Obligation|Necessity|Inevitableness|Request|Demand|Assertion|Certain Estimation|Uncertain Estimation/Schedule|Wish|Execution|Command|Question|Loyalty|Permission|Invitation|Working|Dependence|Passivity|Benefit|Modesty Title|of Honor, or the like.

However, the sort described above is only an example and thus, may be changed. The meaning of words is changed every hour and thus, the meaning sort may be changed according to the changing of times, not unchanging. Further, a vocabulary dictionary according to a thesaurus sort may be referenced at the time of sorting the semantic information.

According to the illustration of FIG. 3,
1) It can be appreciated that "Syng Man lee 125-1" is a "noun" as the part information, a "name" as the semantic information, and "South Korean President" as the synonym information".

2) It can be appreciated that "Naengmyeon 125-2" is a "noun" as the part information, a "food name" as the semantic information, and "representative noodle food in Korea" as the synonym information".

3) It can be appreciated that "Carbon Dioxide 125-3" is a "noun" as the part information, a "harmful material" as the semantic information, and "CO2, global warming" as the synonym information".

4) It can be appreciated that "Seyo 125-4" is an "ending" as the part information, a "request, respect" as the semantic information, and "command" as the synonym information".

5) It can be appreciated that "Nom 125-5" is a "noun" as the part information, "abasement" as the semantic information, and "Num" as the synonym information".

The semantic information and the synonym information may be used to expand and extend the search. For example, when the "Syng Man lee" is used as a keyword, the search result for the "Syng Man lee" and the search result associated with the "South Korean President" may also be provided.

In addition, when the "carbon dioxide countermeasure" is used as a keyword, the "harmful material", the "CO2 countermeasure", and the "global warming countermeasure" as well as the search result for the "carbon dioxide countermeasure" may be further provided.

Similarly, since the semantic information such as "beef, pork, Kimchi", or the like, is "food" and the synonym information is "meat" and "vegetables", it is possible to perform the extension search using the semantic information and the synonym information.

As described above, the part information as well as the semantic information and the synonym information are registered in the morpheme dictionary 125 and thus, the abundant information may be searched.

Hereinafter, the process of analyzing the syntax by processing the phrase/sentence will be further described with reference to FIG. 3.

The syntax analysis is a process of analyzing whether each meaning word constructing the sentence has any structure as a correct sentence. A grammar theory describing a natural language is used to analyze the syntax.

An example of the grammar theory describing the natural language may include a phrase structure grammar, a case grammar, a sensitive grammar, a vocabulary grammar, or the like, which are difference in view of the grammar describing method.

Since the grammar theory is applied to all the languages such as English, Korean, Chinese, Japanese, or the like, the Korean syntax analysis methodology described in the present embodiment may also be applied to other languages.

Figure 4:
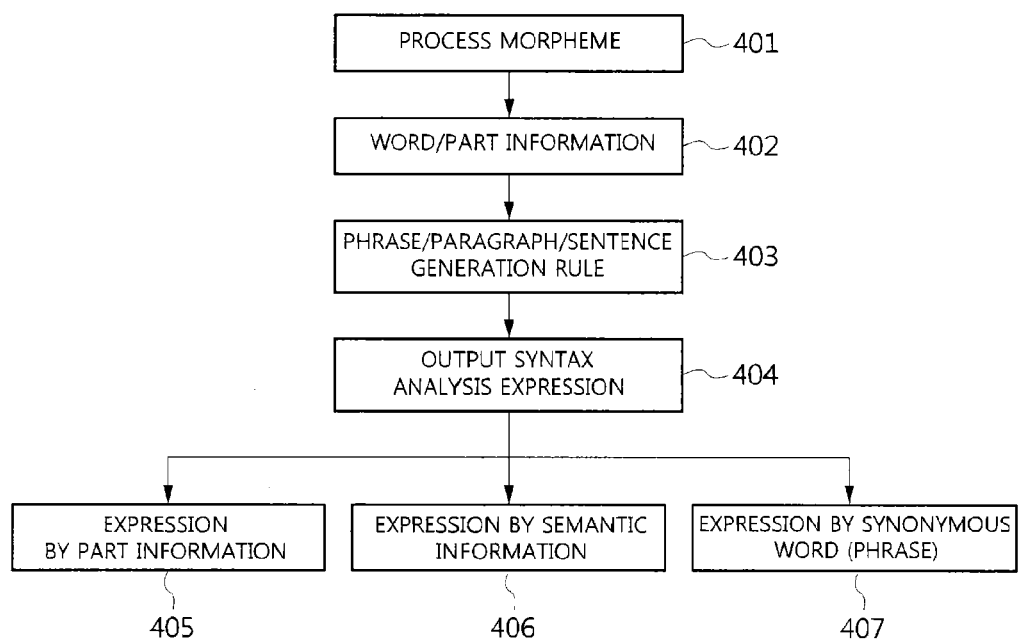
FIG. 4 is a diagram provided for additionally explaining a process of processing phrases/sentences into a morpheme and then, performing syntax analysis.

The input sentence subjected to the morpheme process 401 process shown in FIG. 4 is separated as the meaning word unit and the part information is added to each separated word 402. The part information becomes about 10 to 12 part names such as {noun, pronoun, numeral, adjective, adverb, proposition, . . . }, or the like.

In order to analyze how each word is coupled with each other to form a correct phrase, clause, and sentence, the generation rule 403 for the correct phrase, clause, and sentence in each language is needed. This rule is included in the above-mentioned syntax grammar rule dictionary 123 and thus, is extracted from the syntax grammar rule dictionary 123.

For example, when knowledge, "a sentence includes the subject (noun phrase) and the predicate (verb phrase)" is formulated by a grammar, S (sentence) is represented by ←NP(Noun Phrase)•VP(Verb Phrase). The place where the rule is defined is the generation rule 403 for the phrase, the clause, and the sentence.

Briefly describing these rules, 1) the phrase structure grammar type is defined based on the rule generated in a phrase, a clause, and a sentence in a word unit, 2) the case grammar type and the sensitive grammar type defines the relationship between the modification and the modified of the units in a unit of a word clause, 3) the vocabulary grammar type takes VP=cat (verb, fundamental meaning, . . . , Sub, SEM) type and performs the correct coupling between each word as an operation called unification.

As the detailed example, the phrase structure grammar rule and the processing method are defined as follows.

(1)←S PPV
(2) PP←NP

When the syntax of "come from Seoul" is analyzed, the words of the morpheme processing results (Seoul/N (noun), from/P (proposition), comeN (verb) past) are generated. When the phrase analysis is performed, since the "from Seoul" is "NP", the syntax of the "from Seoul" is analyzed as "PP (proposition phrase) according to the grammar rule (2) and since the "come" is a verb, PP and V are analyzed as 'S(sentence)' according to the grammar rule (1) and thus, the result is output as a tree structural formula or a list structural formula called (come (from Seoul)) in case of Korean.

Meanwhile, when the above-mentioned example sentence is analyzed as the sensitive grammar rule, the syntax analysis relationship in which the word clause, "from Seoul" modifies the word clause, "come" is output by the expression formula called "from Seoul→come".

Further, the vocabulary grammar type outputs the syntax analysis results called (come, [who]. [from Seoul]) as the semantic expression. The present invention may output each of the syntax analysis expressions 404 according to the grammar theory. Therefore, the expression 405 according to the part information, the expression 406 according to the semantic information, and the expression 407 according to the synonym/phrase may be output.

Figure 5:
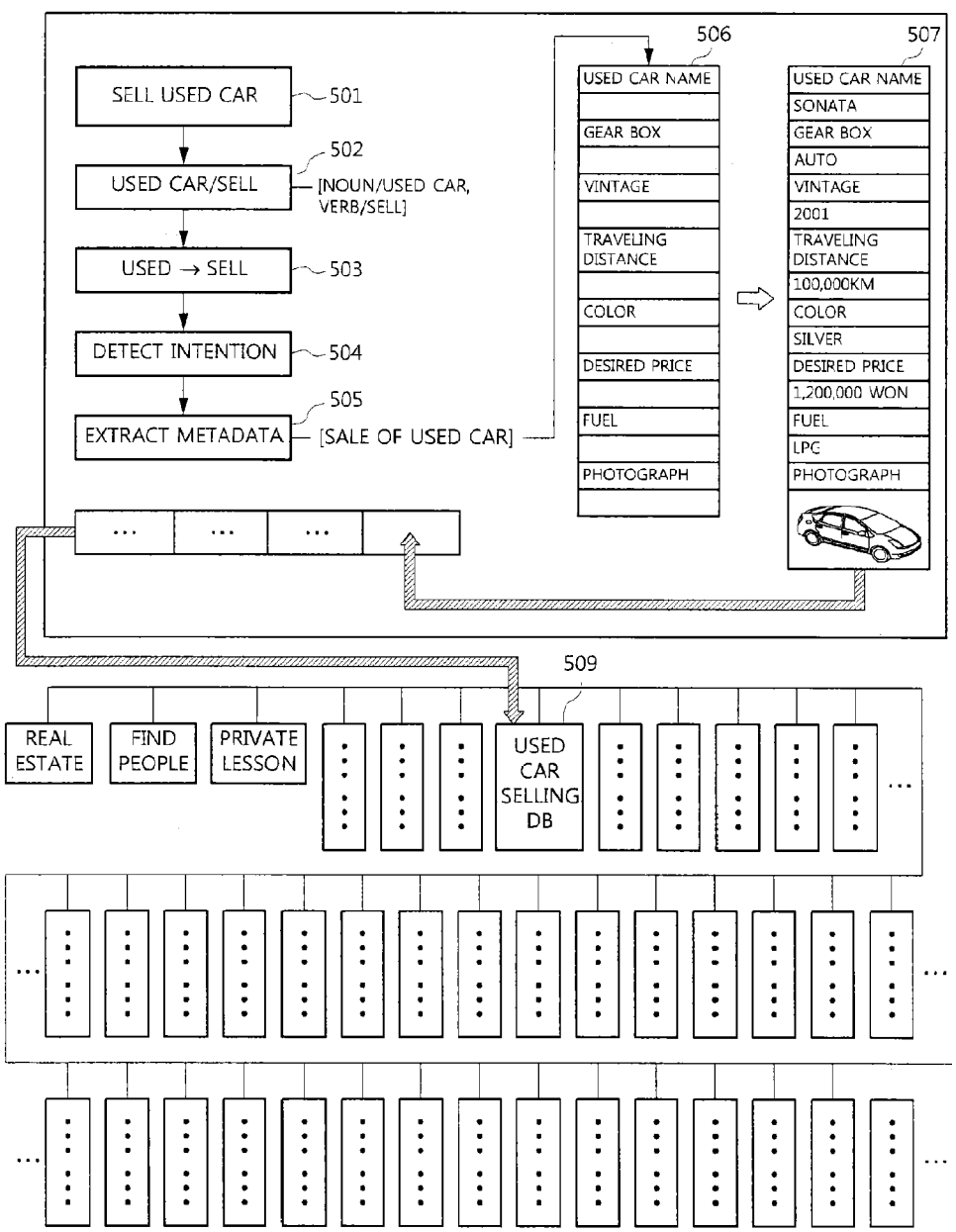
FIG. 5 is a flow chart provided for explaining a search method according to another exemplary embodiment of the present invention.

FIG. 5 shows a flow chart for explaining a search method according to another exemplary embodiment of the present invention.

As shown in FIG. 5, when the user inputs "중고차 팝니다 (Sell Used Car)" through the information providing window 127, the information input device 126 transfers the information input by the user to the information morpheme processor 124 (501).

The information morpheme processor 124 separates the "중고차 팝니다 (Sell Used Car)" for each part by referring to the morpheme dictionary 125 and output "중고차 팝니다 (Sell Used Car)" "as "중고차/팝니다 (Used Car/Sell)" (502).

In this case, the part information and the semantic information (noun/used car, verb/sell) are output together according to the morpheme processing results. In this case, the part information is a noun and a verb and the semantic information is used car and selling.

Thereafter, the information syntax analyzer 122 performs the syntax analysis on the morpheme processing results and outputs the result (used car→sell) (503).

The information provider's intention detector 120 uses the syntax analysis results output from the information syntax analyzer 122 to detect the information provider's intention as the 'sell a used car' (504).

Therefore, the information providing metadata extractor 118 extracts the metadata for the contents suitable for the information provider's intention, the '중고차 판매 (sale of used car)' from the metadata DB 119 (505).

The information providing editor 117 generates the editor in which the extracted metadata become the input item and provides the editor to the information provider (506). As a result, the information provider inputs the metadata through the provided editor (507).

FIG. 5 shows the case in which "used car name: sonata", "gearbox: auto", "vintage: 2001", "traveling distance: 100,000 kilometer", "color: silver", "desired price: 1,200,000 won" and the photograph information are input to the detailed items.

The storage directory determination device 116 determines the directory on the information DB 128 suitable to store the contents and adds the directory index key (used car, selling). This is to store the contents in the corresponding directory. Meanwhile, the storage directory determination device 116 may add the user ID in addition to the directory index key (used car, selling) (508).

Further, the information storage device 115 stores the contents integrating the metadata input by the information providing editor 117 in the information DB 128. In this case, the contents are stored in the directory determined by the storage directory determination device 116.

The process of detecting the user's intention from the information input by the information provider and inducing the detailed metadata input based on the detected intention to be stored as a single content is described in detail above.

Hereinafter, a process of performing a search based on keywords input by a searcher using metadata stored by the above-mentioned process will be described with reference to FIG. 6.

Figure 6:
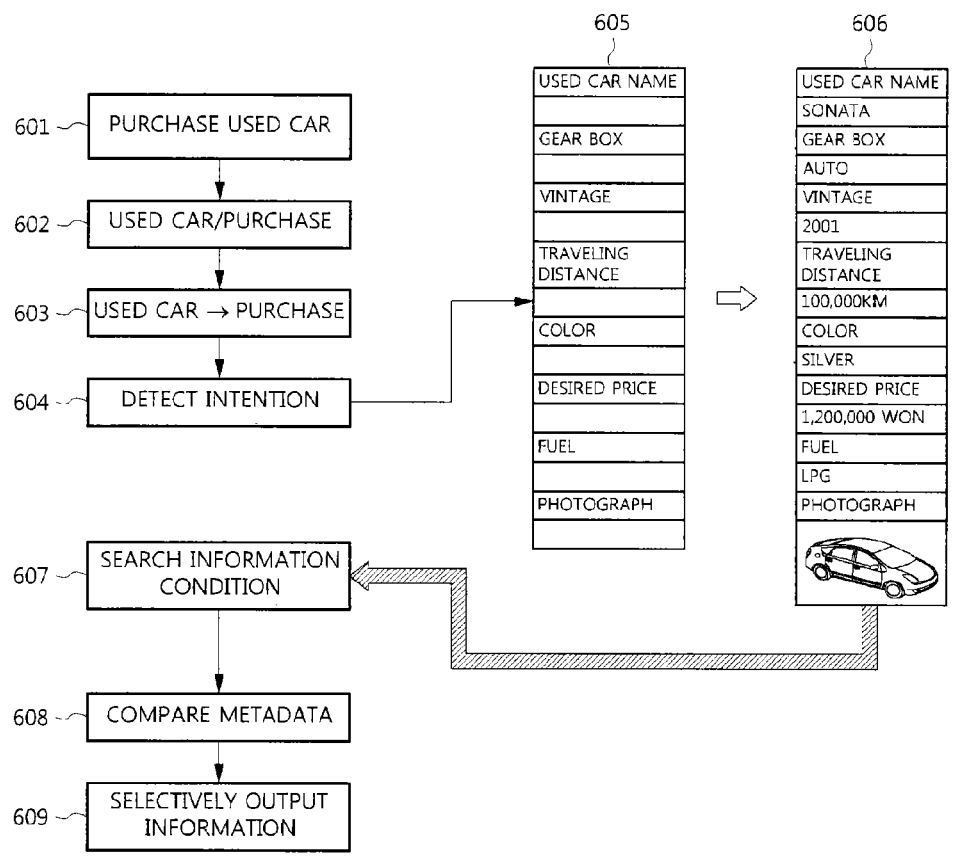
FIG. 6 is a flow chart provided for explaining a search method according to another exemplary embodiment of the present invention.

FIG. 6 is a diagram provided for explaining a search method according to another exemplary embodiment of the present invention. In the exemplary embodiment, when the information searcher inputs keywords, the searcher's search intention is detected and the detailed and accurate search may be made based on the detected searcher's intention. In this case, an example of the keywords input by the user may include words, phrases, and sentences.

As shown in FIG. 6, when the user first inputs keywords "중고차 삽니다 (purchase used car)" through the information search window 101 (601), the keyword morpheme processor 103 separates the input keywords for each part and adds and outputs the part information and the semantic information of noun/중고차, verb/삽니다 (noun/used car, verb/purchase) while being outputting as 중고차/삽니다 (used car/purchase)(602).

Thereafter, the information syntax analyzer 104 performs the syntax analysis based on the morpheme processing results and thus, outputs the result (used car→purchase) (603).

The searcher's intention detector 105 uses the syntax analysis results to detect the searcher's intention as 'used car→purchase' (604).

Thereafter, the metadata extractor for search 107 extracts the metadata for the contents suitable for "purchase used car" that is the searcher's intention from the metadata DB 119 and the editor for search 108 generates the editor in which the metadata extracted by the metadata extractor for search 107 are the input item and provides the editor to the searcher (605).

As a result, the searcher inputs the metadata through the provided editor (606). FIG. 6 shows the case in which "used car name: sonata", "gearbox: auto", "vintage: after 2001", "traveling distance: below 100,000 kilometer", "color: silver", "desired price: 1,200,000 won or less", and "fuel: LPG" are input to the detailed items.

The search directory determination device 109 determines the directory on the information DB 128 suitable to search contents and the search device 110 searches the contents having the same metadata as the metadata input by the editor for search 108 in the information DB 128. The search is performed in the directory determined in the search directory determination device 109.

In this case, the search directory determination device 109 may determine the directory by referring to the searcher's intention detected by the searcher's intention detector 105. It is possible to additionally determine directories similar to the determined directory. This is to perform a wider range of search.

Further, the search device 110 may also perform the same search, a partial search, or a related search.

Thereafter, the metadata comparator 111 compares the metadata input through the editor for search 108 with the metadata configuring the contents searched by the searcher 110 (608). Further, the metadata comparator 111 selects and outputs only the contents having the high coincidence based on the comparison results (609).

Until now, the process of detecting the searcher's intention from the information input by the searcher, inducing the detailed metadata input based on the detected intention, and performing the search in the directory meeting the searcher's intention using the input metadata are described in detail.

The exemplary embodiment of the present invention is implemented to input the metadata using a regular or standardized editor. Therefore, the information provider or the searcher may more conveniently input the metadata and may receive a guide on which type of metadata are input. As a result, it is possible to increase the convenience of input.

The type of inputting the metadata using the regular editor may also be applied to the case of devices such as a mobile phone or an IPTV Meanwhile, the exemplary embodiment of the present invention may perform a condition search, which limits the specific metadata according to the specific conditions. For example, performing the search as keywords "120 만원이하 중고차 (used car of 1,200,000 won or less)" corresponds to the condition search.

Figure 7:
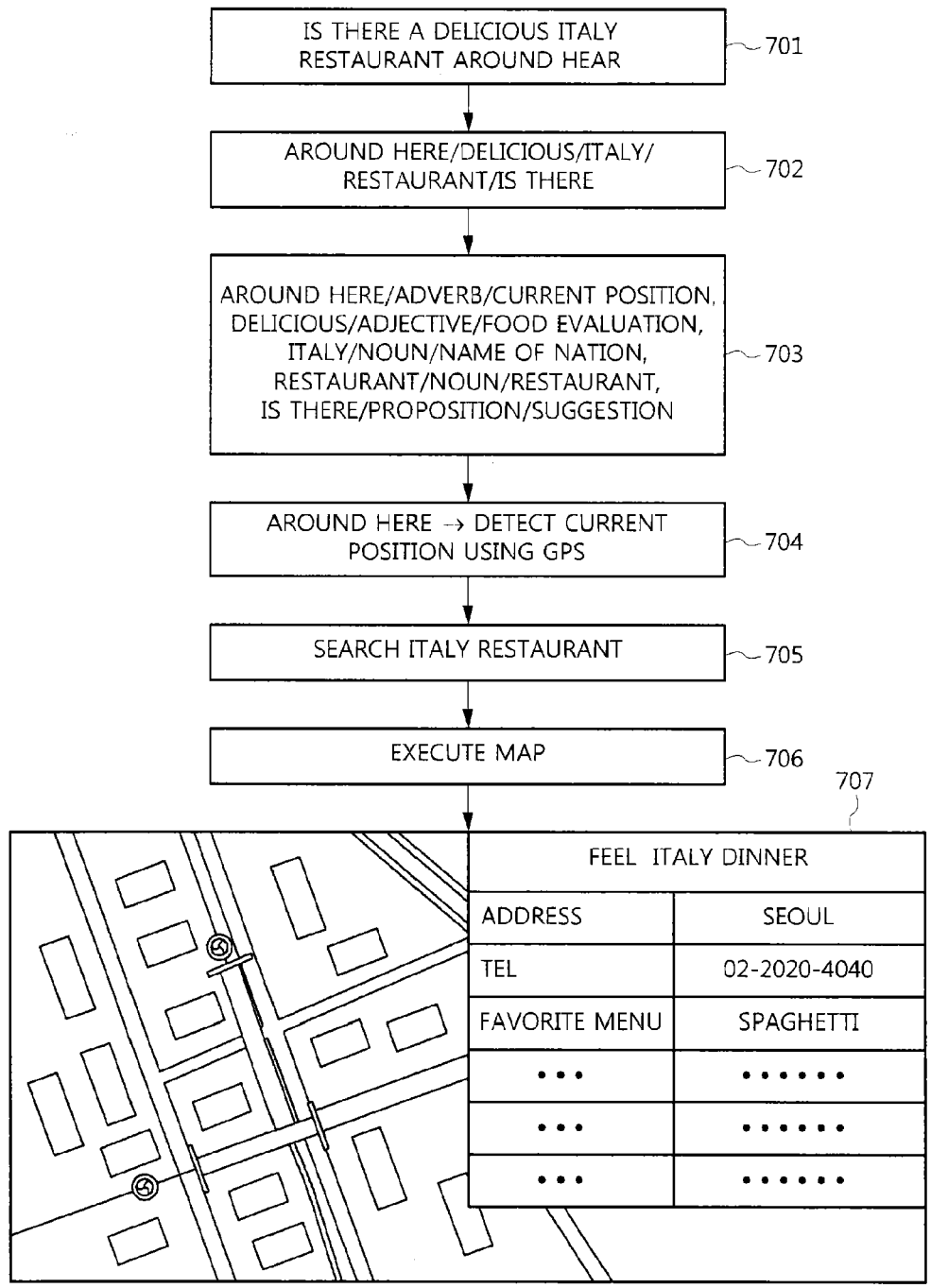
FIG. 7 is a diagram for explaining geographic guide services that are a kind of context awareness search services as an example of additional services stored in an additional service database and generated from an additional service generator.

FIG. 7 is a diagram for explaining geographic guide services that are a kind of context awareness search services as an example of additional services stored in the additional service database 112 and generated from the additional service generator 113.

To this end, it is assumed in FIG. 7 that a sentence "이근처 맛있는 이태리 레스토랑은 (Is there a delicious Italy Restaurant around hear)" (701) is input through the information search window 101.

The input sentence 701 is processed in a morpheme form by the morpheme processor 103 and is separated into "이근처/맛있는/이태리/레스토랑/은 (around hear/delicious/Italy/Restaurant/Is there)" (702) and then, "이근처 (around hear)/noun/current position, 맛있는 (delicious)/adjective/food evaluation, 이태리(Italy)/noun/name of nation, 레스토랑 (Restaurant)/noun/restaurant, 은 (Is there)/proposition/suggestion" (703) to which the semantic information is added is output.

Thereafter, the keyword syntax analyzer 104 analyzes the syntax of the morpheme processing results and the searcher's intention detector 105 detects the searcher's intention through the syntax analysis results. In detail, the searcher's intention detector 105 indicates that the semantic information of the context awareness word '은 (Is there)' is 'provide', the context awareness word "이근처 (around hear)" is detected as a meaning that 'current position that may be confirmed by GPS' is obtained, and '이태리 레스토랑 (Italy restaurant)' is detected as the intention that it is required to search the restaurant database, respectively.

Therefore, the additional service generator 113 detects the current position using the GPS (704), the search device 110 performs the search of the delicious Italy restaurant (705), the additional service generator 113 performs a map (706), and a map indicating the delicious Italy restaurant searched on a map on which the current location is displayed is output (707).

Figure 8:
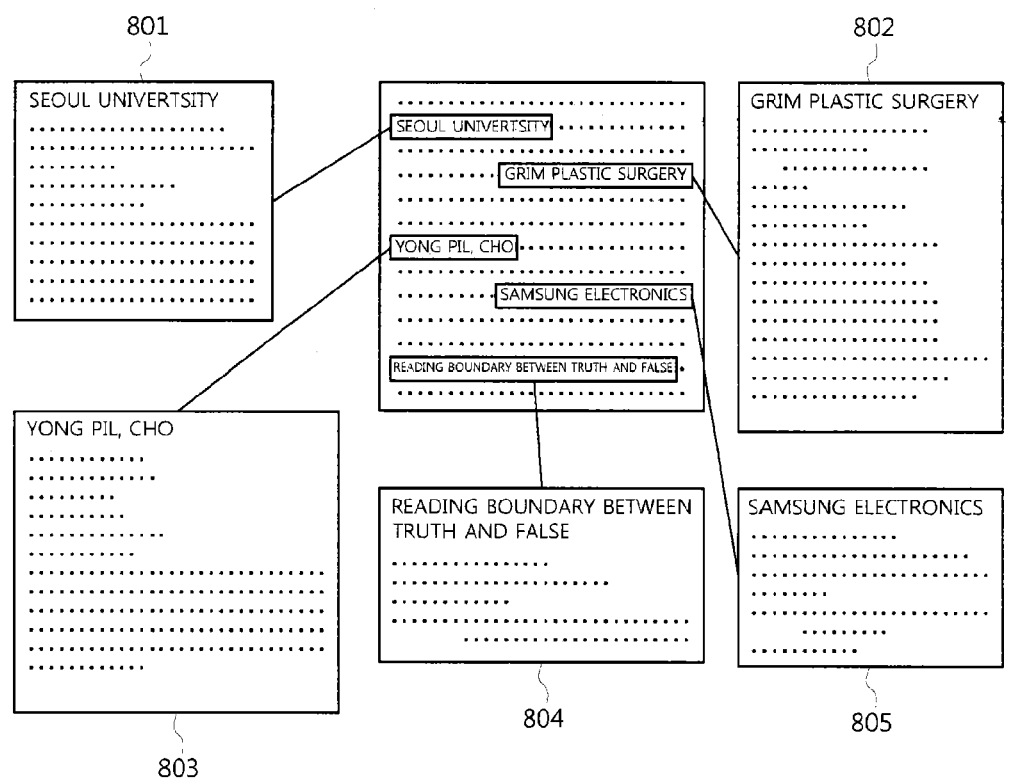
FIG. 8 is a diagram provided for explaining a method of providing additional services that are a different kind from FIG. 7.

FIG. 8 is a diagram provided for explaining a method of providing different kinds of additional services. The additional services shown in FIG. 8 are to provide various additional information relating to a specific word and a subject included in a text output as a search result. To this end, various information such as organization information 801, advertisement 802, character information 803, topic subject information 804, company information 805, or the like, that are stored in the additional service database 112 may be used and may be obtained from other database connected through a network.

Figure 9:
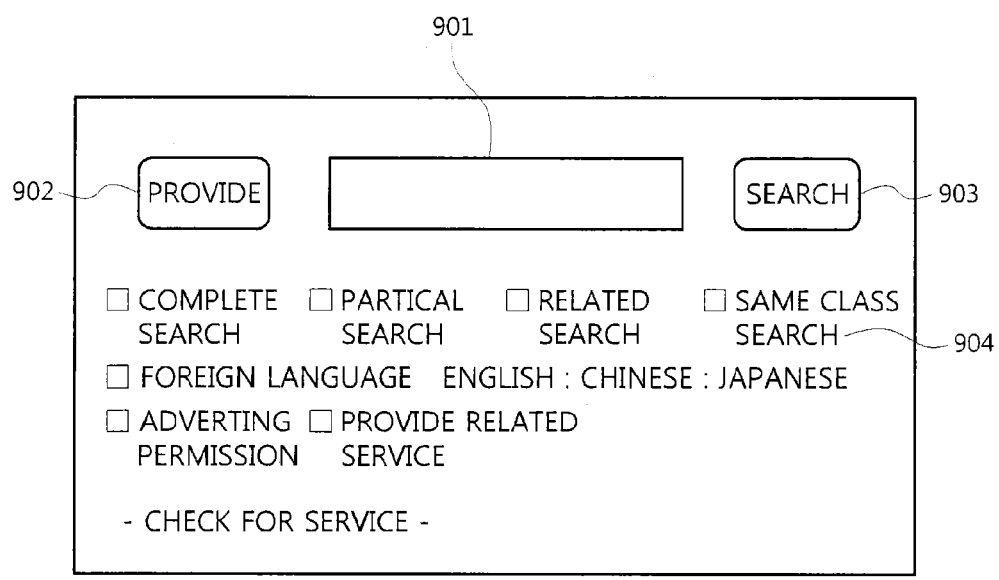
FIG. 9 is a diagram showing an example of an information providing/search window provided together with an information search window and an information providing window.

FIG. 9 is a diagram showing an example of an information providing/search window provided together with an information search window and an information providing window. An input window 901 in the information providing/search window shown is a window used to input keywords, an information providing button 902 is a button used when information is provided/registered input to the input window 901, an information search button 903 is a button used to order the information search on the keywords input to the input window 901.

Further, the buttons 904 provided on the bottom portion are used to set a search method and a method of providing search results. For example, a 'complete search' button proposed in FIG. 9 is used to set the search type as a complete search, a "advertising permission' button is used to permit the display of advertisements related to the search results together with the search results, a 'related service providing permission' button is used to permit the provision of additional information on words and phrases included in the search results together.

The implementation examples proposed in FIGS. 7 to 9 are also applied to other exemplary embodiments to be described below and therefore, the exemplary embodiments to be described below will not repetitively describe the above-implemented examples.

Figure 10:
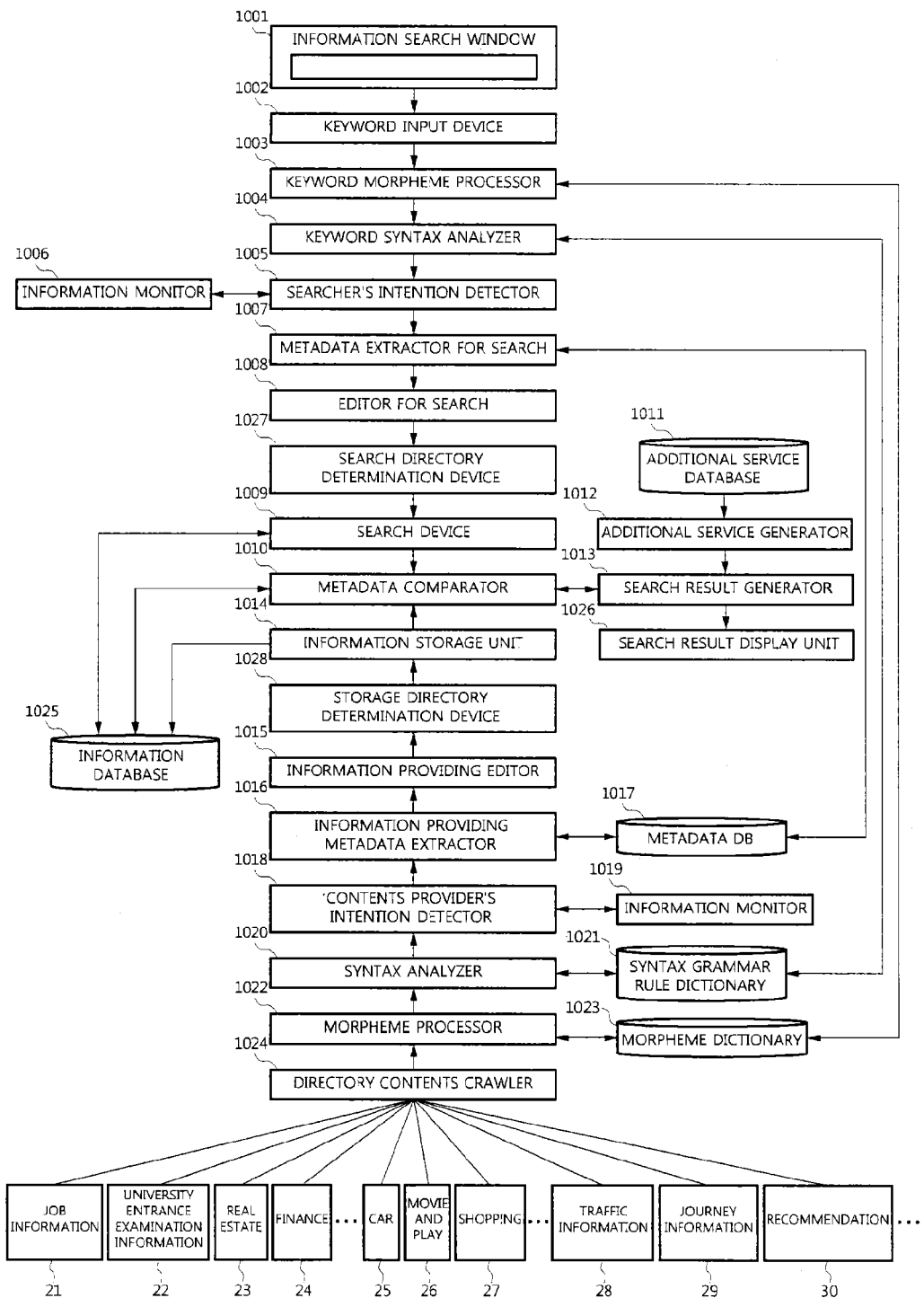
FIG. 10 is a diagram showing a search system according to another exemplary embodiment of the present invention.

FIG. 10 is a diagram showing a search system according to another exemplary embodiment of the present invention. Blocks configuring the search system according to the exemplary embodiment of the present invention may be implemented by S/W and H/W. In addition, some of the blocks configuring the search system may be implemented by S/W and the rest blocks may be implemented by H/W.

As shown in FIG. 10, a search system according to the present exemplary embodiment includes an information search window 1001, a keyword input device 1002, a keyword morpheme processor 1003, a keyword syntax analyzer 1004, a searcher's intention detector 1005, an information monitor 1006, a metadata extractor for search 1007, an editor for search 1008, a search device 1009, a metadata comparator 1010, an additional service database 1011, an additional service generator 1012, a search result generator 1013, an information storage device 1014, an information providing editor 1015, an information providing metadata extractor 1016, a metadata DB 1017, an information provider' intention detector 1018, an information monitor 1019, a syntax analyzer 1020, a syntax grammar rule dictionary 1021, an morpheme processor 1022, a morpheme dictionary 1023, a directory contents crawler 1024, an information DB 1025, a search result display device 1026, a search directory determination device 1027, and a storage directory determination device 1028.

The directory contents crawler 1024 collects the text included in the contents that are separated from each directory. The text collected by the directory contents crawler 1024 is transferred to the morpheme processor 1022 to be described below.

FIG. 10 shows job information 21, university entrance examination information 13, real estate 23, finance 24, car 25, movie and play 26, shopping 27, traffic information 28, journey information 29, recommendation 30, or the like as a directory in which contents are stored but other directories may be applied.

The morpheme dictionary 1023 may be implemented as the same one as the morpheme dictionary 125 shown in FIG. 1. The morpheme processor 1022 separates and outputs the text transferred from the directory contents crawler 1024 for each part by referring to the morpheme dictionary 1023.

The syntax analyzer 1020 performs the syntax analysis on the text included in the contents, based on the morpheme processing results of the morpheme processor 84. The syntax analyzer 1020 refers to the syntax grammar rule dictionary 1021 at the time of performing the syntax analysis.

The contents provider' intention detector 1018 uses the syntax analysis results output from the syntax analyzer 1020 to detect the contents writer's intention.

The information monitor 1019 outputs the information writer's intention detected by the information provider's intention detector 1018 so as to be visible by the user. To this end, the information monitor 1019 may use a graphic tool.

The information providing metadata extractor 1016 extracts the metadata for the contents meeting the information provider's intention detected by the information provider's intention detector 1018 from the metadata DB 1017.

The information providing editor 1015 generates an editor in which the metadata extracted by the information providing metadata extractor 1016 are formed as input terms and provides the editor to the information provider.

The storage directory determination device 1028 determines the directory on the information DB 1025 suitable to store the contents. In this case, the storage directory determination device 1028 may determine the directory by referring to the contents provider's intention detected by the information provider's intention detector 1020.

The information storage device 1014 stores the contents integrating the metadata generated by the information providing editor 1015 in the information DB 1025. In this case, the contents are stored in the directory determined by the storage directory determination device 1028.

The components described up to now are used to collect contents and divide and store the collected contents based on the writer's intention. Hereinafter, when the information searcher requests the search by inputting keywords, the components to more accurately perform the search will be described in detail by inducing the detailed keywords input through the detection of the search intention. In this case, an example of the keywords input by the user may include words, phrases, and sentences.

The information search window 1001 provides the input window by which the user may input the keywords as words, phrases, or sentences. Further, the keyword input device 1002 transfers the keywords input by the user through the information search window 1001 to the keyword morpheme processor 1003.

The morpheme processor 1003 separates and outputs the keywords transferred from the keyword input device 1002 for each part by referring to the morpheme dictionary 1023.

The keyword syntax analyzer 1004 performs the syntax analysis on the keywords input by the searcher, based on the morpheme processing results of the keyword morpheme processor 1003. The keyword syntax analyzer 1004 refers to the syntax grammar rule dictionary 1021 at the time of performing the syntax analysis.

The searcher's intention detector 1005 uses the syntax analysis results output from the keyword syntax analyzer 1004 to detect the searcher's intention.

The information monitor 1006 outputs the searcher's intention detected by the searcher's intention detector 1005 so as to be visible by the user. To this end, the information monitor 1006 may use a graphic tool.

The metadata extractor for search 1007 extracts the metadata for the contents meeting the searcher's intention detected by the searcher's intention detector 1005 from the metadata DB 1017.

The editor for search 1008 generates an editor in which the metadata extracted by the metadata extractor for search 1007 are formed as input terms and provides the editor to the searcher.

The search directory determination device 1027 determines the directory on the information DB 1025 suitable to search the contents. In this case, the search directory determination device 1027 may determine the directory by referring to the searcher's intention detected by the searcher's intention detector 1005. Further, the search directory determination device 1027 may additionally determine the directories similar to the determined directories. This is to perform a wider range of search.

The searcher 1009 searches the contents having the same metadata as the metadata input by the editor for search 1008 in the information DB 1025. In this case, the search is performed in the directory determined in the search directory determination device 1027.

The searching device 1009 may perform the extension search that performs the search by replacing the metadata input by the editor for search 1008 with the synonymous metadata.

Further, the search device 1009 may search the contents having the exactly same metadata as the metadata in view of the structure and word and the same metadata as the metadata only in view of some of the structure and word. That is, the search device 1009 may also perform the same search, a partial search, or a related search.

The metadata comparator 1010 compares the metadata input through the editor for search 1008 with the metadata configuring the contents searched by the searcher 1010 and selects and outputs only the contents having the high coincidence based on the comparison results. As described above, the comparison (determining the coincidence) may be performed by a method comparing the metadata, respectively, formed in a table format.

As described above, the comparison (determining the coincidence) may be performed by a method comparing the metadata, respectively, formed in a table format.

The additional service database 1011 may store a unit that provides the site information appropriate for the searcher's search intention or the relevant advertising service, or the like.

The additional service generator 1012 generates the additional services related to the search keys. To this end, the additional service generator 1012 uses the additional services appropriate for the searcher's search intention among the additional services that are stored in the additional service database 1011.

The additional services provided by the additional service database 1011 and the additional service generator 1012 may be implemented as the contents context awareness services. In this case, an example of the contents context awareness services may include guide services, selling service, advertising services, education services, consulting services, recommendation services, or the like.

The search result generator 1013 adds the additional services generated from the additional service generator 1012 according to the coincidence with the search results (contents) output from the metadata comparator 1010.

The search result display unit 1026 outputs the search results added with the additional services generated from the search result generator 1013 through the screen so as to be provided to the user.

Meanwhile, only the search results and the coincidence may be provided to the user, without providing any additional services. This may be implemented in such a manner that the additional service generator 1012 does not generate the additional services or the search result generator 1013 does not add the generated additional services even though the additional service generator 113 generates the additional services.

Figure 11:
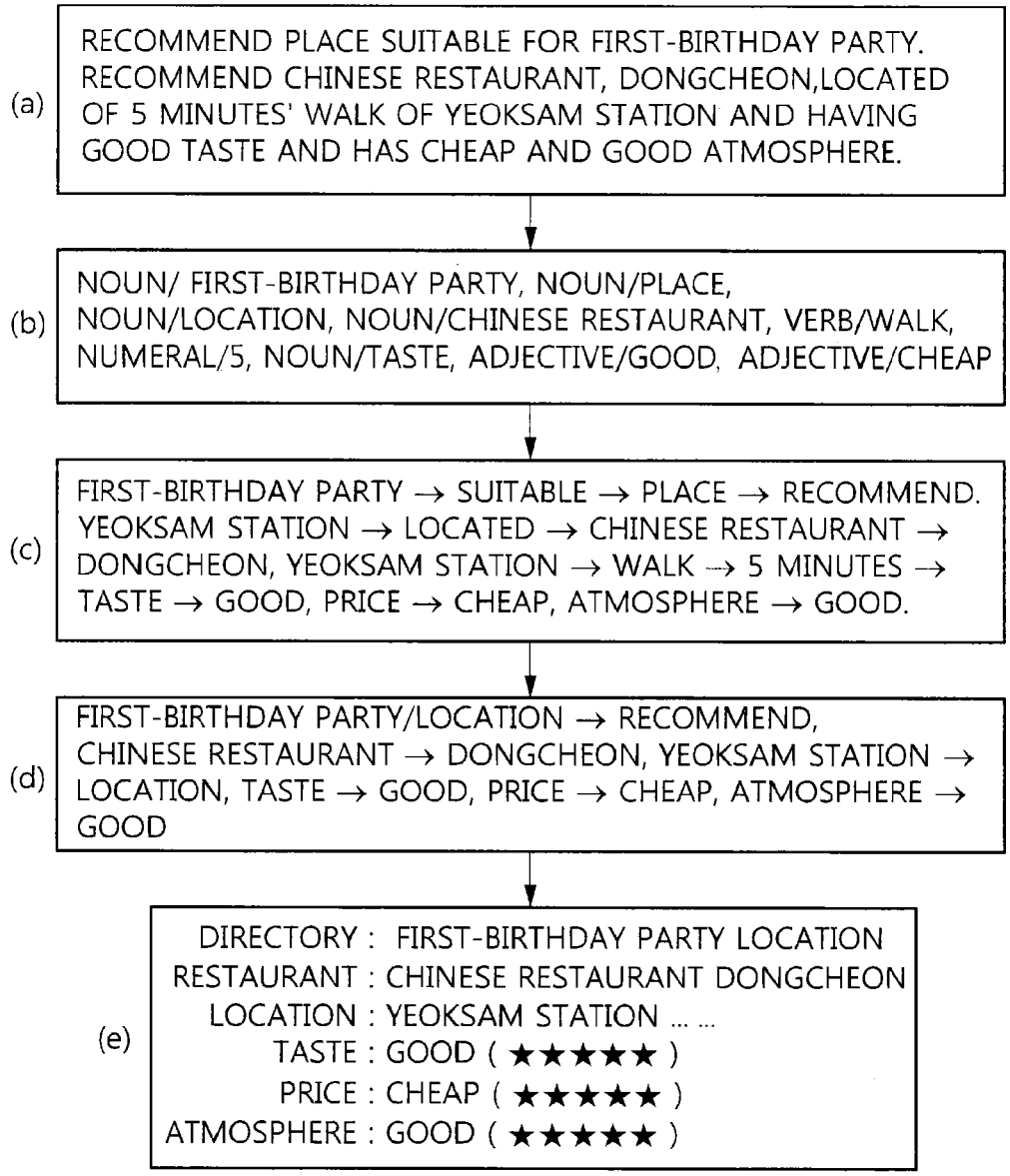

Hereinafter, a process of considering the case in which writing recommending Chinese Restaurant together with a story of experience of a first-birthday party is listed on a recommendation directory 30 and storing the writing as information will be described in detail with reference to FIG. 11. FIG. 11 is a diagram provided for explaining a search method according to another exemplary embodiment of the present invention.

First, the directory contents crawler 1024 collects a recommendation writing listed on the recommendation directory 30 and transfers the recommendation writing to the morpheme processor 1022 as shown in FIG. 11A.

Thereafter, the morpheme processor 1022 performs the morpheme processing by referring to the morpheme dictionary 1023. The morpheme processing results by the morpheme processor 1022 are shown in FIG. 11B.

Thereafter, the syntax analyzer 1020 performs the syntax analysis for FIG. 11B. The morpheme analysis results by the syntax analyzer 1020 are as shown in FIG. 11C.

Further, the contents provider's intention detector 1018 detects the provider's intention based on FIG. 11C. The provider's intention detected by the contents provider's intention detector 1018 is as shown in FIG. 11D.

Thereafter, the information providing metadata extractor 1016 extracts the metadata for contents meeting the provider's intention from the metadata DB 1017.

The information providing editor 1015 generates an editor in which the extracted metadata become the input item and provides the editor to the information provider.

In FIG. 11D, contents meeting "first-birthday party→place→recommendation" is "first-birthday place providing" contents. The information providing editor 1015 arranges the contents provider's intention detected by the contents provider's intention detector 1018 as shown in FIG. 11E. Further, the information providing editor 1015 automatically inputs the corresponding metadata to each item of an editor shown in FIG. 12A, wherein the input results are as shown in FIG. 12B.

The storage directory determination device 1028 determines the directory on the information DB 1025 suitable to store the contents. In this case, the storage directory determination device 1028 may determine the directory by referring to the contents provider's intention detected by the information provider's intention detector 1018.

The information storage device 1014 stores the contents integrating the metadata generated by the information providing editor 1015 in the information DB 1025. In this case, the contents are stored in the directory determined by the storage directory determination device 1028.

According to the exemplary embodiment of the present invention divides the corresponding information for each directory based on the contents provider's intention and may match and store the corresponding metadata.

Hereinafter, a process of performing a search based on the keywords input by an information searcher using the metadata stored by the above-mentioned process will be described with reference to FIG. 13.

FIG. 13 is a diagram provided for explaining a search method according to another exemplary embodiment of the present invention. In the exemplary embodiment, when the information searcher inputs keywords, the searcher's search intention is detected and the detailed and accurate search may be made based on the searcher's intention. In this case, an example of the keywords input by the user may include words, phrases, and sentences.

As shown in FIG. 13, when the user inputs the keywords "이번 토요일 볼만한 뮤지컬 추천 바람(Please recommend worth musical this Saturday)" through the information search window 1001 (1301), the keyword morpheme processor 1003 separates the input keyword for each part and adds and outputs the part information and the semantic information of (noun/this, noun/day of the week, adjective/worth, noun/musical, noun/recommendation, injection/please) (1303), simultaneously with outputting (this time/Saturday/ looking/musical/recommendation/wishing) (1302).

Thereafter, the keyword syntax analyzer 1004 performs the syntax analysis based on the morpheme processing results and thus, outputs (this time→Saturday, worth→musical, →recommendation,→wishing) as the result (1304).

As the result of the syntax analysis, it may be appreciated that there may be two context awareness information in the example sentence. One is a date as real physical data of "all Saturdays" and the other is "intention" of "recommendation, request".

Therefore, the keyword syntax analyzer 1004 performs the context awareness processing for the former, which will be described below.

First, a process of generating context awareness real data for "this Saturday" will be described in detail. FIG. 14 shows context awareness words indicating time, which may be listed in the morpheme dictionary 1023. As shown in FIG. 14, the semantic information of each word is defined as "past", "present", "future", or the like.

Figures 15, 16:
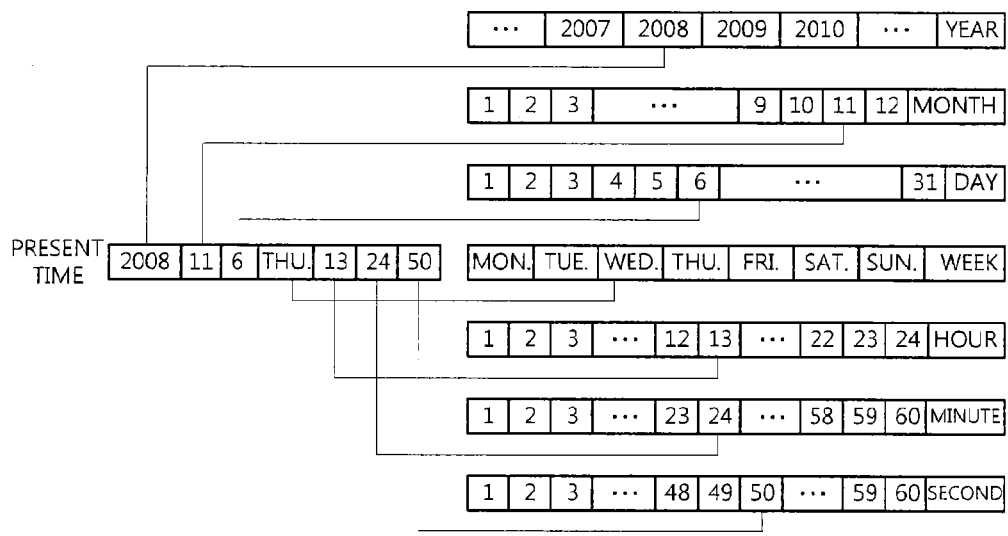

FIG. 15 shows the case managed by the system by designating the "present time" in a unit of "year", "month", "day of the week", "date", "hour", "minute", "second".

FIG. 16 shows a manner of quantitatively calculating the language representation of "this Saturday" at present time today. That is, since one to be obtained is a real quantitative time in the language representation indicating time to be obtained, when the morpheme processing is performed on the "this Saturday", day of the week of the present time obtained in a system calendar from the semantic information: this/ current, Saturday/Saturday" is Wednesday and since a current system "Saturday" is in three days of "Wednesday→Thursday=Friday→Saturday", the real data of Nov. 9, 2008 may be generated when three days are added to the current date Nov. 6, 2008.

By the above-mentioned process, the language representation indicating time different form current may also be deformed as the real data. The generation of the context awareness real data for "this Saturday" described with reference to FIGS. 14 to 16 corresponds to 1306, 1037, and 1308 of FIG. 13.

Meanwhile, the searcher's intention detector 1005 uses the syntax analysis results to detect the searcher's intention as 'musical→recommendation→request' (1308).

Thereafter, the metadata extractor for search 1007 extracts the metadata for the contents suitable for "musical recommendation request" that is the searcher's intention from the metadata DB 1017 and the editor for search 1008 generates an editor in which the metadata extracted by the metadata extractor for search 1007 are the input item and provides the editor to the searcher (1311). In this case, the performance date "Nov. 9, 2008" that is the generated real data is automatically input to the editor.

As a result, the searcher inputs the metadata through the provided editor (1312).

The search directory determination device 1027 determines the directory on the information DB 1025 suitable to search the contents and the search device 1009 searches the contents having the same metadata as the metadata input by the editor for search 1008 in the information DB 1025 (1313). The search is performed in the directory determined in the search directory determination device 1027.

In this case, the search directory determination device 1027 may determine the directory by referring to the searcher's intention detected by the searcher's intention detector 1005. It is possible to additionally determine directories similar to the determined directory. This is to perform a wider range of search.

Further, the search device 1009 may also perform the same search, a partial search, or a related search.

Thereafter, the metadata comparator 1010 compares the metadata input through the editor for search 1008 with the metadata configuring the contents searched by the search device 1009 (1314). Further, the metadata comparator 1010 selects and outputs only the contents having the high coincidence based on the comparison results (1315).

Until now, the process of detecting the searcher's intention from the information input by the searcher, inducing the detailed metadata input based on the detected intention, automatically inputting the metadata generating the real data, and performing the search in the directory meeting the searcher's intention using the metadata are described above in detail.

In the exemplary embodiment described up to now, the information provider or the information searcher's intention are automatically detected by analyzing the input language representation.

For example, the representation including the language representation such as "obtain, buy, purchase, give, request, ask, find", or the like is detected as the intention called "information search" as the meaning of the information "search" in the meaning called "find information", while all the representation including the language representation such as "sell, sale, provide, give, present", or the like, is detected as the intention of "information providing" as the meaning of the information "providing" in the meaning of "provide information" and is processed the intention.

The exemplary embodiment to be described with below adopts a directly inputting method by the information provider or the information searcher, rather than automatically detecting the information provider and information searcher's intention. This is to more accurately detect the information provider and information searcher's intention.

Figure 17:
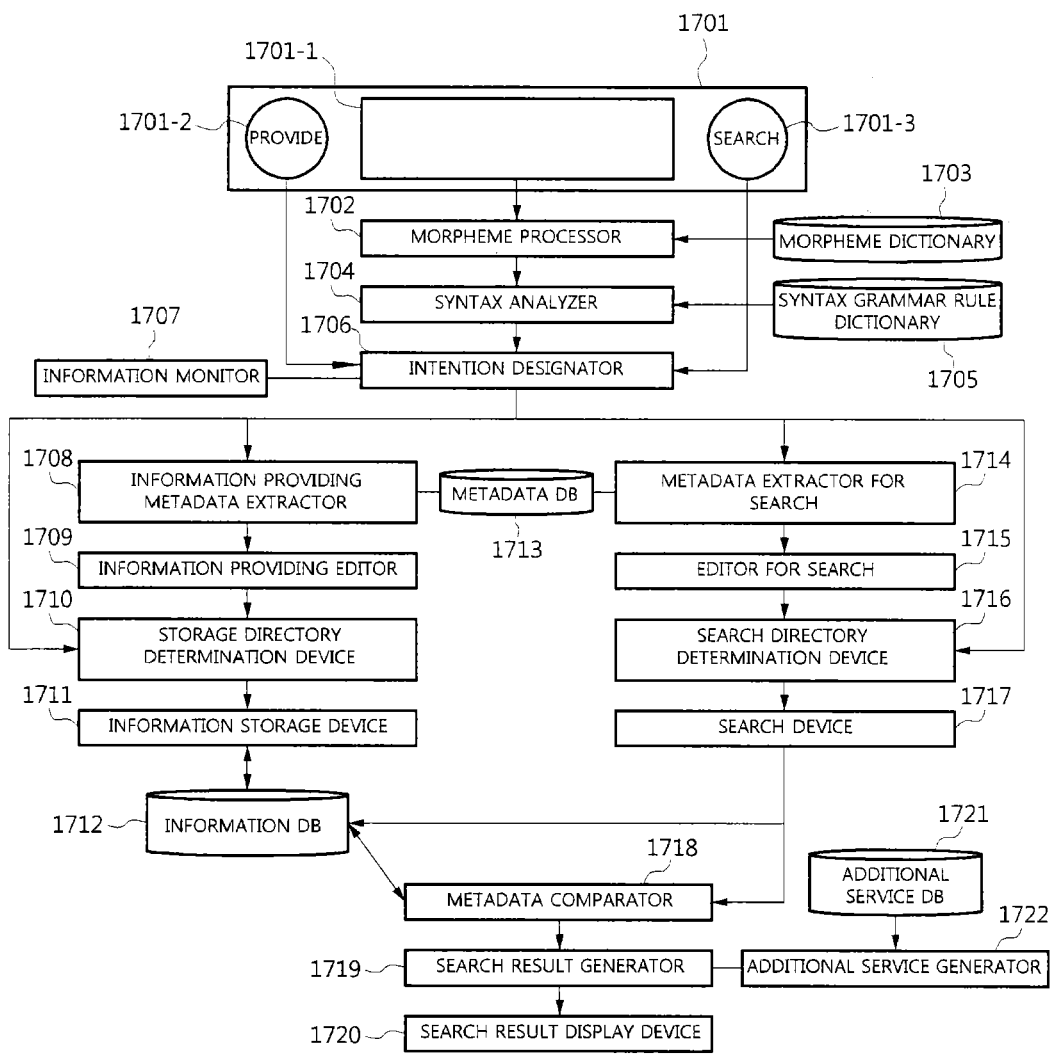
FIG. 17 is a diagram showing a search system according to another exemplary embodiment of the present invention.

FIG. 17 shows a search system according to an exemplary embodiment of the present invention. Blocks configuring the search system according to the exemplary embodiment of the present invention may be implemented by S/W and H/W. In addition, some of the blocks configuring the search system may be implemented by S/W and the rest blocks may be implemented by H/W.

As shown in FIG. 17, the search system according to the exemplary embodiment of the present invention includes an information providing/search window 1701, a morpheme processor 1702, a morpheme dictionary 1703, a syntax analyzer 1704, a syntax grammar rule dictionary 1705, an intention designator 1706, an information monitor 1707, an information providing metadata extractor 1708, an information providing editor 1709, a storage directory determination device 1710, an information storage unit 1711, an information DB 1712, a metadata DB 1713, a metadata extractor for search 1714, an editor for search 1715, a search directory determination device 1716, a search device 1717, a metadata comparator 1718, a search result generator 1719, a search result display unit 1720, an additional service database 1721, and an additional service generator 1722.

The information providing/search window 1701 is a user interface that is used to input information to be registered by the information provider or input keywords by the information searcher.

The information providing/search window 1701 is provided with an input window 1701-1, an information providing button 1701-2, and an information search button 1701-3. The input window 1701-1 is a window used to input the information or the keywords to be provided and the input window 1701-1 may be input with the information and the keywords as words, phrases, or sentences.

The information providing button 1701-2 is a button used when providing and registering the information input to the input window 1701-1 and the information search button 1701-3 is a button used to common the information search for the keywords input to the input window 1701-1.

The information or the keywords input through the information providing/search window 1701 are transferred to the morpheme processor 1702.

The morpheme dictionary 1703 may be implemented as the same one as the morpheme dictionary 125 shown in FIG. 1. The morpheme processor 1702 separates and outputs the information or the keywords input through the information providing/search window 1701 by referring to the morpheme dictionary 1023 for each part.

The syntax analyzer 1704 performs the syntax analysis on the user's input information or the keywords, based on the morpheme processing results of the morpheme processor 1702. The syntax analyzer 1704 refers to the grammar rule registered in the syntax grammar rule dictionary 1705 at the time of performing the syntax analysis.

The intention designator 1706 provides the user interface unit for directly designating the information provider's intention or the information searcher's intention and integrates the intention designated by the syntax analysis results to output the final intention.

The information monitor 1707 outputs the final intention output from the intention designator 1706 so as to be visible by the user. To this end, the information monitor 1707 may use a graphic tool.

The information providing metadata extractor 1708 extracts the metadata for the contents meeting the information provider's final intention output from the intention designator 1706 from the metadata DB 1713.

The information providing editor 1709 generates the editor in which the metadata extracted by the information providing metadata extractor 1708 are formed as input terms and provides the editor to the information provider.

The storage directory determination device 1710 determines the directory on the information DB 1712 suitable to store the contents. In this case, the storage directory determination device 1710 may determine the directory by referring to the information provider's final intention detected by the intention designator 1706.

The information storage unit 1711 stores the contents integrating the metadata generated by the information providing editor 1709 in the information DB 1709. In this case, the contents are stored in the directory determined by the storage directory determination device 1710.

The metadata extractor for search 1714 extracts the metadata for the contents meeting the information provider's final intention output from the intention designator 1706 from the metadata DB 1713.

The search editor 1715 generates an editor in which the metadata extracted by the metadata extractor for search 1714 are formed as input terms and provides the editor to the searcher.

The search directory determination device 1716 determines the directory on the information DB 1712 suitable to search the contents. In this case, the search director determination device 1716 may determine the directory by referring to the searcher's final intention output from the intention designator 1706.

Further, the search directory determination device 1716 may additionally determine the directories similar to the determined directories. This is to perform a wider range of search.

The search device 1717 searches the contents having the same metadata as the metadata input by the editor for search 1715 in the information DB 1712. In this case, the search is performed in the directory determined in the search directory determination device 1716.

The search device 1717 may perform the extension search that performs the search by replacing the metadata input by the search editor 1715 with the synonymous metadata.

Further, the search device 1717 may search the contents having the exactly same metadata as the metadata in view of the structure and word and the same metadata as the metadata only in view of some of the structure and word. That is, the search device 1717 may also perform the same search, a partial search, or a related search.

The metadata comparator 1718 compares the metadata input through the editor for search 1715 with the metadata configuring the contents searched by the searcher 1717 and selects and outputs only the contents having the high coincidence based on the comparison results. As described above, the comparison (determining the coincidence) may be performed by a method comparing the metadata, respectively, formed in a table format.

The additional service database 1721 may store a unit that provides the site information appropriate for the searcher's search intention or the relevant advertising service, or the like.

The additional service generator 1722 generates the additional services related to the search keys. To this end, the additional service generator 1722 uses the additional services appropriate for the searcher's search intention among the additional services that are stored in the additional service database 1721.

The additional services provided by the additional service database 1721 and the additional service generator 1722 may be implemented as the contents context awareness services. In this case, an example of the contents context awareness services may include guide services, selling service, advertising services, education services, consulting services, recommendation services, administrative services, or the like.

The search result generator 1719 adds the additional services generated from the additional service generator 1722 according to the coincidence with the search results (contents) output from the metadata comparator 1718.

The search result display unit 1720 outputs the search results added with the additional services generated from the search result generator 1719 through the screen so as to be provided to the user.

Meanwhile, only the search results and the coincidence may be provided to the user, without providing any additional services. This may be implemented in such a manner that the additional service generator 1722 does not generate the additional services or the search result generator 1719 does not add the generated additional services even though the additional service generator 113 generates the additional services.

Figure 18:
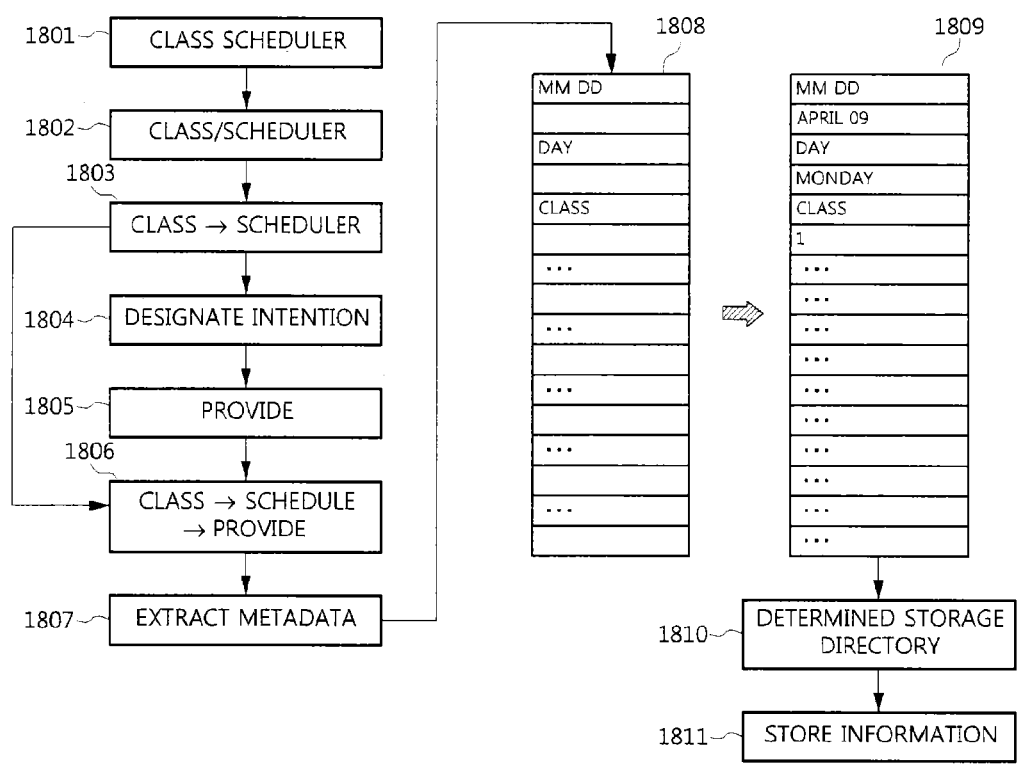
FIG. 18 is a flow chart provided for explaining a search method according to another exemplary embodiment of the present invention.

FIG. 18 is a flow chart provided for explaining a search method according to another exemplary embodiment of the present invention.

As shown in FIG. 18, when the user inputs "schedule a class" to the input window 1701-1 of the information providing/search window 1701 and presses the information providing button 1701-2 (1801), the morpheme processor 1702 separates the "schedule a class" for each part by referring to the morpheme dictionary 1703 to be output as the "schedule a class" (1802).

Thereafter, the syntax analyzer 1704 performs the syntax analysis on the morpheme processing results and outputs the result (class→schedule) (1803).

Thereafter, when the information provider's intention is designated as "providing" by the intention designator 1706 (1804 and 1805), the intention designator 1706 outputs the final intention "class→schedule→providing" integrating the designated intention based on the syntax analysis (1806).

Thereafter, the information providing metadata extractor 1708 extracts the metadata for the contents suitable for the information provider's final intention "class→schedule→providing" from the metadata DB 1713 (1807).

The information providing editor 1709 generates the editor in which the extracted metadata become the input item and provides the editor to the information provider (1808). As a result, the information provider inputs the metadata through the provided editor (1809).

Thereafter, the storage directory determination device 1710 determines the directory on the information DB 1712 suitable to store the contents(1810).

Further, the information storage device 1711 stores the contents integrating the metadata input by the information providing editor 1709 in the information DB 1712. In this case, the contents are stored in the directory determined by the storage directory determination device 1710.

Up to now, the process of detecting the information provider's final intention from the information and the intention input by the information provider and inducing the detailed metadata input based on the detected intention to be stored as a single contents are described in detail above.

Hereinafter, a process of performing a search based on the keywords and intention input by an information searcher using the metadata stored by the above-mentioned process will be described with reference to FIG. 19.

Figure 19:
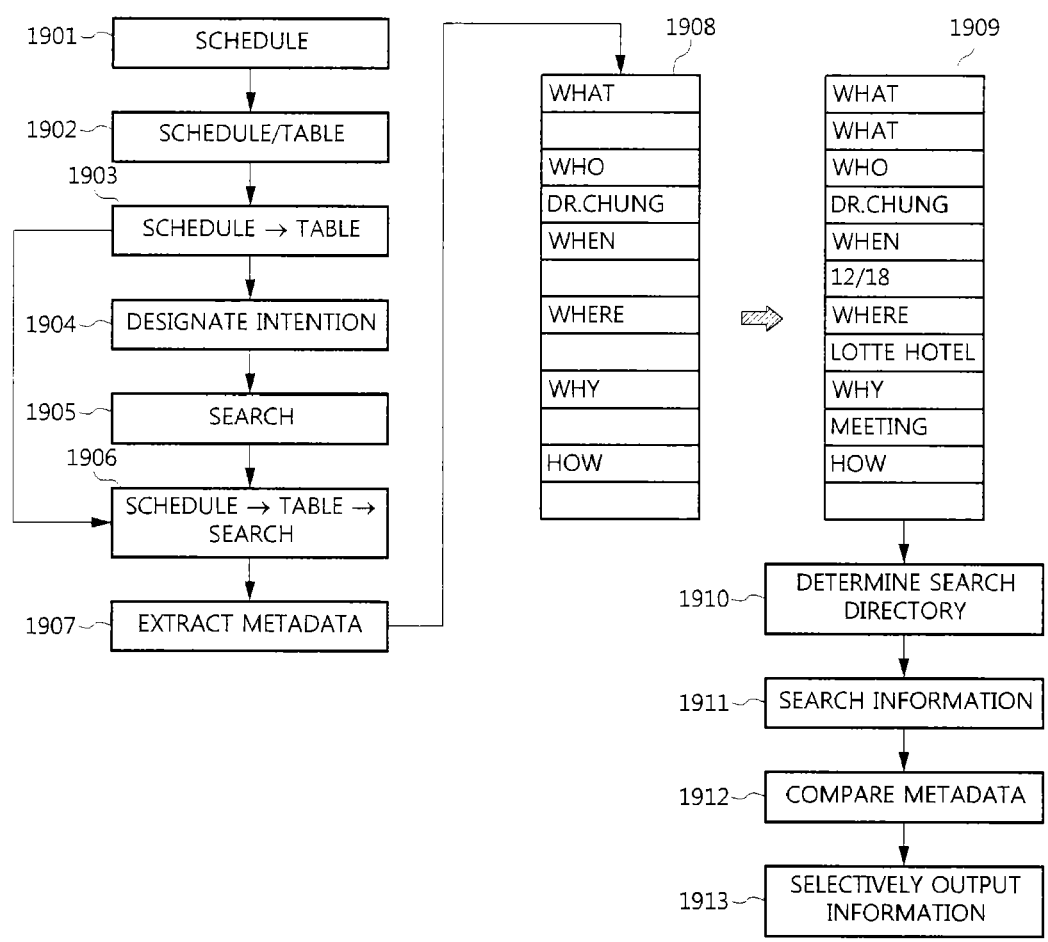
FIG. 19 is a diagram provided for explaining a search method according to another exemplary embodiment of the present invention.

FIG. 19 is a diagram provided for explaining a search method according to another exemplary embodiment of the present invention. In the exemplary embodiment of the present invention, the information searcher may perform the detailed and accurate search based on the keywords and intention. In this case, an example of the keywords input by the user may include words, phrases, and sentences.

As shown in FIG. 19, when the user inputs "schedule list" to the input window 1701-1 of the information providing/search window 1701 and presses the search button 1701-3 (1901), the morpheme processor 1702 separates the "schedule list" for each part by referring to the morpheme dictionary 1703 to be output as the "schedule/list" (1902).

Thereafter, the syntax analyzer 1704 performs the syntax analysis on the morpheme processing results and outputs the result (schedule→list) (1903).

Thereafter, when the information provider's intention is designated as "search" by the intention designator 1706 (1904 and 1905), the intention designator 1706 outputs the final intention "schedule→list→search" integrating the designated intention based on the syntax analysis (1906).

Thereafter, the metadata extractor for search 1714 extracts the metadata for the contents suitable for the "schedule→list→search" that is the searcher's final intention from the metadata DB 1713 and the editor for search 1715 generates an editor in which the metadata extracted by the metadata extractor for search 1714 are the input item and provides the editor to the searcher (1908).

As a result, the searcher inputs the metadata through the provided editor (1909).

The search directory determination device 1716 determines the directory on the information DB 1712 suitable to search the contents (1910) and the search device 1717 searches the contents having the same metadata as the metadata input by the editor for search 1715 in the information DB 1712 (1911). The search is performed in the directory determined in the search directory determination device 1716.

In this case, the search directory determination device 1716 may determine the directory by referring to the searcher's intention detected by the intention designator 1706. It is possible to additionally determine directories similar to the determined directory. This is to perform a wider range of search.

Further, the search device 1717 may also perform the same search, a partial search, or a related search.

Thereafter, the metadata comparator 1718 compares the metadata input through the editor for search 1715 with the metadata configuring the contents searched by the search device 1717 (1912). Further, the metadata comparator 1718 selects and outputs only the contents having the high coincidence based on the comparison results (1913).

Until now, the process of inducing the detailed metadata input based on the information and the intention input by the searcher and performing the search in the directory meeting the searcher's intention using the input metadata are described above in detail.

The foregoing exemplary embodiment may be used for publicizing candidates for an electronic vote.

Figure 20:
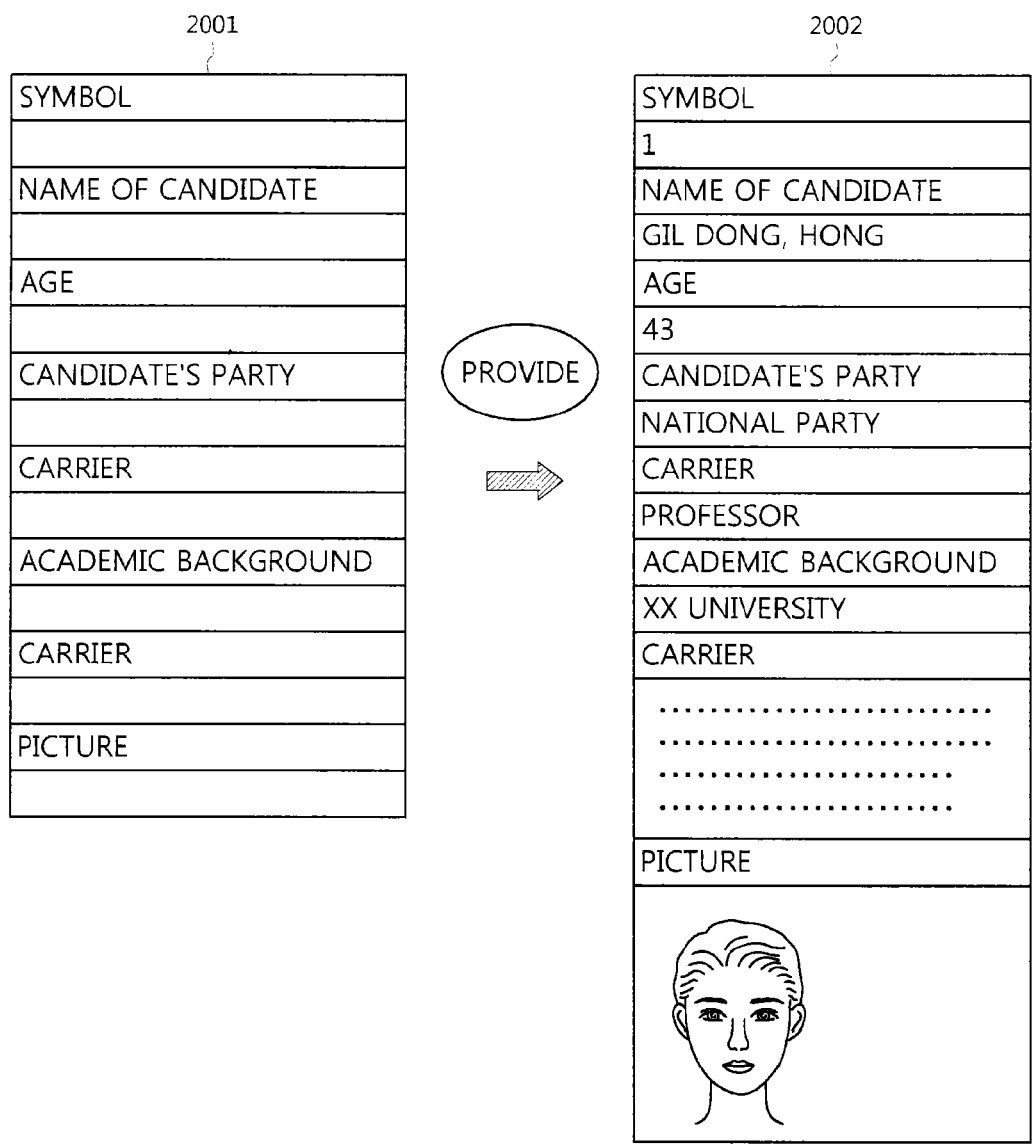
FIG. 20 is a diagram showing an example applied for publicizing candidates for an electronic vote.

FIG. 20 shows results of inputting the metadata to an editor that is generated by inputting "providing public information of candidates" to the information providing/search window 1701 and performing the morpheme processing, the syntax analysis, the intention designation, and the metadata extraction thereon and the editor that is provided by the information provider.

Thereafter, when the information is stored in the information DB 1712 by the storage directory determination, the promotion materials for candidates may be distributed to voters through PCs, mobile phones, or the like. Therefore, it is possible to rapidly provide the promotion materials of candidates using the paper poster that is being currently used at low cost.

The foregoing exemplary embodiments may be implemented in mobile information devices such as a mobile phone as well as in other information devices. In addition, the information providing button and the information search button may be corresponds/allocates to a specific button (key) of mobile information devices such as a mobile phone as well as other information devices.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A computer-implemented method for searching information in a system including an information database that stores information contents and a metadata database that stores metadata describing the information contents, the method comprising:
   detecting an intention of an information searcher by using a result of a syntax analysis of keywords inputted by the information searcher;
   extracting a plurality of metadata which describe information contents meeting the detected intention of the information searcher from the metadata stored in the metadata database;
   generating an editor in a table form in which the plurality of metadata extracted from the metadata stored in the metadata database are paired with a plurality of metadata fields of the editor and displaying the generated editor to the information searcher;
   receiving a plurality of metadata items inputted by the information searcher through the plurality of metadata fields of the editor;
   determining a search directory for searching contents in the information database according to the detected intention of the information searcher;
   searching information contents having metadata corresponding to the plurality of metadata items inputted through the plurality of metadata fields of the editor from the information database;
   comparing the plurality of metadata items inputted through the plurality of metadata fields of the editor with the searched metadata corresponding to the searched information contents;
   selecting, among the searched information contents, information contents having a degree of coincidence exceeding a pre-defined threshold based on a comparison result; and
   displaying the selected information contents.

2. The method of claim 1, further comprising:
   separating the inputted keywords into meaningful words; and
   performing the syntax analysis on the meaningful keywords,
   wherein the detecting the intention is performed by using the syntax analysis on the meaningful keywords.

3. The method of claim 2, wherein the performing the syntax analysis comprises:
   outputting a syntax expression obtained by analyzing whether the separated keywords have any grammar relationship and semantic relations within a sentence as the result of the syntax analysis.

4. The method of claim 3, wherein the syntax expression is at least one of logical expressions, modification-modified expressions and syntax list expressions.

5. The method of claim 1, wherein the inputted keywords are one of a word unit, a phrase unit and a sentence unit.

6. The method of claim 1, further comprising: adding at least one additional service to a result of the searching.

7. The method of claim 6, wherein the additional service is a contents context awareness service including at least one of guide services, selling services, advertising services, education services, consulting services, recommendation services, auction services and administrative services.

8. A computer-implemented method for providing information in a system including an information database that stores information contents and a metadata database that stores metadata describing the information contents, the method comprising:
   detecting an intention of an information provider by using a result of a syntax analysis of keywords inputted by the information provider;
   extracting a plurality of metadata which describe information contents meeting the detected intention of the information provider from the metadata stored in the metadata database;
   generating an editor in a table form in which the plurality of metadata extracted from the metadata stored in the metadata database are paired with a plurality of metadata fields of the editor and displaying the generated editor to the information provider;
   receiving a plurality of metadata items inputted by the information provider through the plurality of metadata fields of the editor;
   determining a store directory for storing contents in the information database according to the detected intention of the information provider; and
   storing information contents represented by the plurality of inputted metadata items integrated with the plurality of metadata in the directory of the information database determined according to the detected intention of the information provider.

9. The method of claim 8, further comprising:
   separating the inputted keywords into meaningful words; and
   performing the syntax analysis on the meaningful keywords,
   wherein the detecting the intention is performed by using the syntax analysis on the meaningful keywords.

10. The method of claim 9, wherein the performing the syntax analysis comprises:
    outputting a syntax expression obtained by analyzing whether the separated keywords have any grammar relationship and semantic relations within a sentence as the result of the syntax analysis.

11. The method of claim 10, wherein the syntax expression is at least one of logical expressions, modification-modified expressions and syntax list expressions.

12. The method of claim 8, wherein the inputted keywords are one of a word unit, a phrase unit and a sentence unit.

13. A computer-implemented method for searching and providing information in a system including an information database that stores information contents and a metadata database that stores metadata describing the information contents, the method comprising:
- detecting an intention of an information searcher by using a result of a syntax analysis of keywords inputted by the information searcher;
- extracting a plurality of metadata which describe information contents meeting the detected intention of the information searcher from the metadata stored in the metadata database;
- generating an editor of the information searcher in a table form in which the plurality of metadata extracted from the metadata stored in the metadata database are paired with a plurality of metadata fields of the editor and displaying the generated editor to the information searcher;
- receiving a plurality of metadata items inputted by the information searcher through the plurality of metadata fields of the editor of the information searcher;
- determining a search directory for searching contents in the information database according to the detected intention of the information searcher;
- searching information contents having metadata corresponding to the plurality of metadata items inputted through the plurality of metadata fields of the editor of the information searcher from the information database;
- comparing the plurality of metadata items inputted through the plurality of metadata fields of the editor of the information searcher with the searched metadata corresponding to the searched information contents;
- selecting, among the searched information contents, information contents having a degree of coincidence exceeding a pre-defined threshold based on a comparison result;
- displaying the selected information contents;
- detecting an intention of an information provider by using a result of the syntax analysis of keywords inputted by the information provider;
- extracting a plurality of metadata which describe information contents meeting the detected intention of the information provider from the metadata stored in the metadata database;
- generating an editor of the information provider in a table form in which the plurality of metadata extracted from the metadata stored in the metadata database are paired with a plurality of metadata fields of the editor and displaying the generated editor of the information provider to the information provider;
- receiving a plurality of metadata items inputted by the information provider through the plurality of metadata fields of the editor of the information provider;
- determining a store directory for storing information contents in the information database according to the detected intention of the information provider; and
- storing information contents represented by the plurality of inputted metadata items integrated with the plurality of metadata in the directory of the information database determined according to the intention of the information provider.

14. The method of claim 13, further comprising: separating the keywords inputted by the information searcher into meaningful words; and
- performing the syntax analysis on the meaningful keywords, wherein the detecting the intention of the information searcher is performed by using the syntax analysis on the meaningful keywords.

15. The method of claim 14, wherein the performing the syntax analysis comprises:
- outputting a syntax expression obtained by analyzing whether the separated keywords have any grammar relationship and semantic relations within a sentence as the result of the syntax analysis.

16. The method of claim 15, wherein the syntax expression is at least one of logical expressions, modification-modified expressions and syntax list expressions.

17. The method of claim 13, wherein the inputted keywords are one of a word unit, a phrase unit and a sentence unit.

18. The method of claim 13, further comprising: adding at least one additional service to a result of the searching.

19. The method of claim 18, wherein the additional service is a contents context awareness service including at least one of guide services, selling services, advertising services, education services, consulting services, recommendation services, auction services and administrative services.

20. A computer-implemented system for searching information, the system comprising:
- an information database that stores information contents;
- a metadata database that stores metadata describing the information contents;
- an intention detector that detects an intention of an information searcher by using a result of a syntax analysis of keywords inputted by the information searcher;
- a metadata extractor that extracts a plurality of metadata which describe information contents meeting the detected intention of the information searcher from the metadata stored in the metadata database;
- an editor for search that generates an editor in a table form in which the plurality of metadata extracted from the metadata stored in the metadata database are paired with a plurality of metadata fields of the editor and displays the generated editor to the information searcher;
- a search directory determination device that determines a search directory for searching contents in the information database according to the detected intention of the information searcher;
- a search device that searches information contents having metadata corresponding to a plurality of metadata items inputted through the plurality of metadata fields of the editor from the information database;
- a metadata comparator that compares the plurality of metadata items inputted through the plurality of metadata fields of the editor with the searched metadata corresponding to the searched information contents and selects, among the searched information contents, information contents having a degree of coincidence exceeding a pre-defined threshold based on a comparison result; and
- a hardware display unit that displays the selected information contents.

21. The system of claim 20, wherein the editor in the table form is a tool to describe information contents using metadata and enables the information searcher to input real values into the plurality of metadata fields corresponding to the plurality of metadata extracted by the metadata extractor.

22. The system of claim 20, wherein the search device searches information contents having the same metadata as at least one of the plurality of metadata items inputted through the plurality of metadata fields of the editor or information contents having synonymous metadata with at least one of the plurality of metadata items inputted through the plurality of metadata fields of the editor.

23. The system of claim 20, further comprising:
an additional service generator that generates additional services related to a result of the searching.

24. The system of claim 23, wherein the additional service is a contents context awareness service including at least one of guide services, selling services, advertising services, education services, consulting services, recommendation services, auction services and administrative services.

25. A computer-implemented system for providing information, the system comprising:
an information database that stores information contents;
a metadata database that stores metadata describing the information contents;
an intention detector that detects an intention of an information provider by using a result of a syntax analysis of keywords inputted by the information provider;
a metadata extractor that extracts a plurality of metadata which describe information contents meeting the detected intention of the information provider from the metadata stored in the metadata database;
an information providing editor that generates an editor in a table form in which the plurality of metadata extracted from the metadata stored in the metadata database are paired with a plurality of metadata fields of the editor and displays the generated editor to the information provider;
an information receiver that receives a plurality of metadata items inputted by the information provider through the plurality of metadata fields of the editor; and
a storage directory determination device that determines a store directory for storing information contents represented by a plurality of metadata items inputted by the information provider through the plurality of metadata fields of the editor and integrated with the plurality of metadata in the information database according to the detected intention of the information provider.

26. The system of claim 25, wherein the editor in the table form is a tool to describe information contents using metadata and enables the information provider to input real values into the plurality of metadata fields corresponding to the plurality of metadata extracted by the metadata extractor.

27. The system of claim 25, further comprising:
an additional service generator that generates additional services related to a result of the searching.

28. The system of claim 27, wherein the additional service is a contents context awareness service including at least one of guide services, selling services, advertising services, education services, consulting services, recommendation services, auction services and administrative services.

29. A computer-implemented system for searching and providing information, the system comprising:
an information database that stores information contents;
a metadata database that stores metadata describing the information contents;
an intention detector of an information searcher that detects an intention of the information searcher by using a result of a syntax analysis of keywords inputted by the information searcher;
a metadata extractor of the information searcher that extracts a plurality of metadata which describe information contents meeting the detected intention of the information searcher from the metadata stored in the metadata database;
an editor for search that generates an editor of the information searcher in a table form in which the plurality of metadata extracted from the metadata stored in the metadata database are paired with a plurality of metadata fields and displays the generated editor of the information searcher to the information searcher;
a search directory determination unit that determines a search directory for searching contents in the information database according to the detected intention of the information searcher;
a search device that searches information contents having metadata corresponding to a plurality of metadata items inputted through the plurality of metadata fields of the editor of the information searcher from the information database;
a metadata comparator that compares the plurality of metadata items inputted through the plurality of metadata fields of the editor of the information searcher with the searched metadata corresponding to the searched information contents and selects, among the searched information contents, information contents having a degree of coincidence exceeding a pre-defined threshold based on a comparison result;
a display unit that displays the selected information contents;
an intention detector of an information provider that detects an intention of the information provider by using a result of the syntax analysis of keywords inputted by the information provider;
a metadata extractor of the information provider that extracts a plurality of metadata which describe information contents meeting the detected intention of the information provider from the metadata stored in the metadata database;
an information providing editor that generates an editor of the information provider in a table form in which the plurality of metadata extracted from the metadata stored in the metadata database are paired with a plurality of metadata fields and displays the generated editor to the information provider; and
an information receiver that receives a plurality of metadata items inputted by the information provider through the plurality of metadata fields of the editor; and
a storage directory determination device that determines a store directory for storing information contents represented by a plurality of metadata items inputted by the information provider through the plurality of metadata fields of the editor and integrated with the plurality of metadata in the information database according to the detected intention of the information provider.

30. The system of claim 29, wherein the editor of the information searcher is a tool to describe information contents using metadata and enables the information searcher to input real values into the plurality of metadata fields corresponding to the plurality of metadata extracted by the metadata extractor of the information searcher.

31. The system of claim 29, wherein the search device searches information contents having the same metadata as at least one of the plurality of metadata items inputted through the plurality of metadata fields of the editor of the information searcher or information contents having synonymous metadata with at least one of the plurality of metadata items inputted through the plurality of metadata fields of the editor of the information searcher.

32. The system of claim 29, further comprising:
an additional service generator that generates additional services related to a result of the searching.

33. The system of claim 32, wherein the additional service is a contents context awareness service including at least one of guide services, selling services, advertising services, education services, consulting services, recommendation services, auction services and administrative services.

* * * * *